(12) United States Patent
Hsu et al.

(10) Patent No.: US 12,048,978 B2
(45) Date of Patent: Jul. 30, 2024

(54) ROBOTIC TOOL CHANGER SYSTEM AND METHOD FOR PERFORMING TOOL CHANGE WITH ROBOTIC TOOL CHANGER SYSTEM

(71) Applicant: CHIEFTEK PRECISION CO., LTD., Tainan (TW)

(72) Inventors: Ming-Che Hsu, Tainan (TW); Syuan-Jyun Wu, Tainan (TW)

(73) Assignee: Chieftek Precision Co., Ltd., Tainan (TW)

(*) Notice: Subject to any disclaimer, the term of this patent is extended or adjusted under 35 U.S.C. 154(b) by 235 days.

(21) Appl. No.: 17/667,916

(22) Filed: Feb. 9, 2022

(65) Prior Publication Data
US 2023/0173685 A1 Jun. 8, 2023

(30) Foreign Application Priority Data

Dec. 6, 2021 (TW) ................................. 110145491

(51) Int. Cl.
*B25J 15/04* (2006.01)
*B23Q 3/155* (2006.01)

(52) U.S. Cl.
CPC ...... *B23Q 3/15536* (2016.11); *B23Q 3/15506* (2013.01); *B25J 15/0491* (2013.01); *B23Q 2003/15527* (2016.11); *Y10S 483/901* (2013.01); *Y10T 483/1809* (2015.01)

(58) Field of Classification Search
CPC ... Y10S 483/901; B25J 15/0491; B25J 15/04; B25J 15/0408; B25J 15/0425; B25J 15/0433; Y10T 483/1809; B23Q 2003/15527; B23Q 3/15553

USPC .................................................... 483/901, 59
See application file for complete search history.

(56) References Cited

U.S. PATENT DOCUMENTS

| | | | |
|---|---|---|---|
| 5,044,063 A | | 9/1991 | Voellmer |
| 5,294,209 A | * | 3/1994 | Naka .................... B25J 15/0491 403/328 |
| 5,514,062 A | * | 5/1996 | Stadele ................ B25J 15/0491 901/41 |

(Continued)

FOREIGN PATENT DOCUMENTS

| | | |
|---|---|---|
| DE | 102007030035 A1 | 1/2009 |
| DE | 102019119657 A1 | 1/2021 |

(Continued)

*Primary Examiner* — Erica E Cadugan
(74) *Attorney, Agent, or Firm* — Rosenberg, Klein & Lee

(57) ABSTRACT

A robotic tool changer system and a method for performing a tool change with the robotic tool changer system are disclosed. Providing a plurality of second coupling units each connected with a tool, wherein the second coupling units are detachably connected to a respective tool changer grippers; driving a first coupling unit along a second direction with a robot arm end shaft to be coupled with a selected second coupling unit; driving the first coupling unit coupled with the selected second coupling unit away from the corresponding tool changer gripper in a first direction, defining an angle between the first direction and the second direction; wherein when the selected second coupling unit is moved to the corresponding tool changer gripper and before the first coupling unit to separate from the selected second coupling unit, a third acting force is applied to the selected second coupling unit for restricting movement.

46 Claims, 33 Drawing Sheets

(56) References Cited

U.S. PATENT DOCUMENTS

| | | | | |
|---|---|---|---|---|
| 5,779,609 | A | * | 7/1998 | Cullen ................ B25J 15/04 483/901 |
| 5,993,365 | A | | 11/1999 | Stagnitto et al. |
| 11,130,243 | B2 | | 9/2021 | Son |
| 2004/0192524 | A1 | | 9/2004 | Nolte et al. |
| 2020/0276719 | A1 | * | 9/2020 | Buind ................ B25J 19/0025 |
| 2022/0234218 | A1 | * | 7/2022 | Canti ................ B25J 15/0433 |
| 2023/0405837 | A1 | * | 12/2023 | Hsu ................ B25J 15/0458 |

FOREIGN PATENT DOCUMENTS

| | | | |
|---|---|---|---|
| EP | 525699 | A1 | 2/1993 |
| GB | 2292365 | A * | 2/1996 |
| JP | 05-169383 | A | 7/1993 |
| TW | 202126425 | A | 7/2021 |
| WO | 2020249465 | A1 | 12/2020 |
| WO | 2021025800 | A1 | 2/2021 |

* cited by examiner

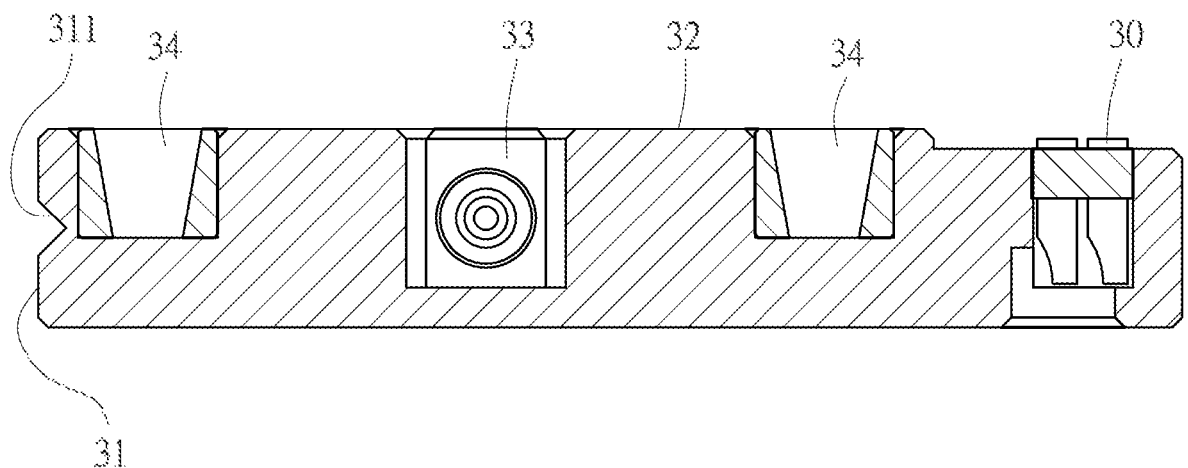
F I G . 10A

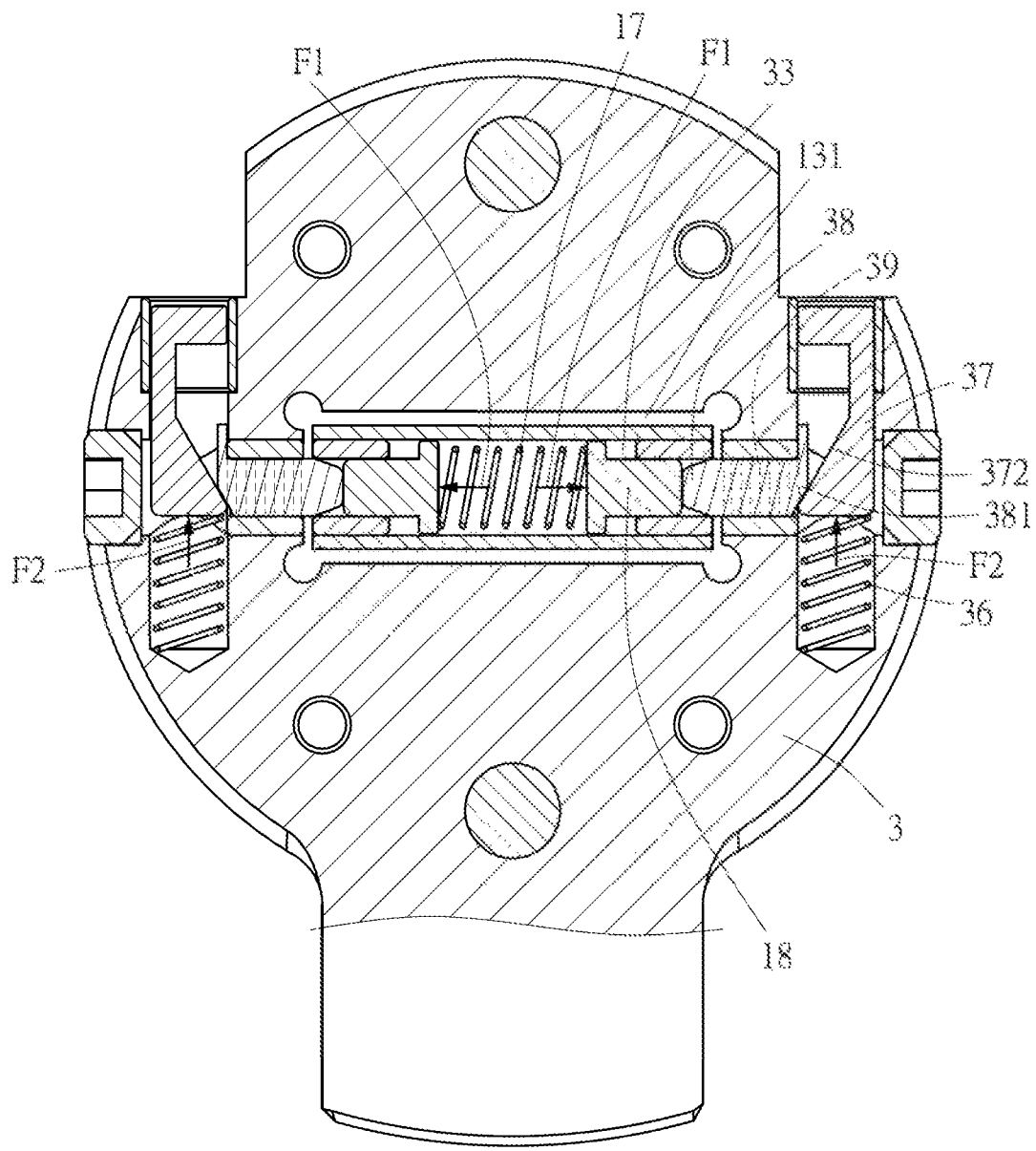
F I G . 23

ROBOTIC TOOL CHANGER SYSTEM AND METHOD FOR PERFORMING TOOL CHANGE WITH ROBOTIC TOOL CHANGER SYSTEM

FIELD OF THE INVENTION

The present invention relates to a robotic tool changer system and a method for performing a tool change with the robotic tool changer system. In particular, a robot arm end shaft is manipulated to approach a tool changer gripper in a second direction, with an automatic unlocking and locking mechanism to take a tool out of the tool changer gripper or to place the tool in the tool changer gripper in a first direction that has an angle (for example, 90 degrees) with the second direction. In the process of changing the tool, a third force-applying member is configured to keep the stability of changing the tool. Besides, when the tool is in the tool changer gripper, the tool can be stably held by tool changer gripper.

BACKGROUND OF THE INVENTION

When a machining apparatus is used to machine a workpiece, it is necessary to replace a tool according to the wear of the tool or different parts to be machined. In general, a machining robot adopts a robotic tool changer.

As disclosed in Taiwan Patent Publication No. 202126425, titled "no-impact tool changing apparatus", the apparatus includes a tool locking arm that can rotate on a plane. A tool engaging block is provided at either end of the tool locking arm. The tool engaging block is configured to engage with or disengage from a tool horizontally through an elastic force-applying member for performing a tool change. However, the freedom of movement of the tool locking arm is relatively low.

As disclosed in China Patent Publication No. CN111201116A, titled "quick robotic arm tool changer", the robot arm is used for performing a tool change, thereby improving the freedom for a tool change. However, in the tool change process, the coupling unit of the robot arm is moved to the tool change gripper in a horizontal manner along a direction to be coupled with the tool coupling unit, and then takes the tool coupling unit out of the tool change gripper in a horizontal manner along the direction. This method requires a larger space for a tool change.

As disclosed in PCT International Publication No. WO2020249465A1 titled "TOOL CHANGER FOR COLLABORATIVE ROBOTS, A ROBOT TOOL CHANGER SYSTEM AND A METHOD FOR CONNECTING A TOOL TO A ROBOT ARM" and U.K. Patent Application Publication No. GB2292365A titled "automatic tool changer", the robot arm is to couple a tool coupling unit held by a tool changer gripper, and then drives the tool coupling unit out of the tool changer gripper in a horizontal direction, so that the tool can be changed in a small space. In the disclosure of PCT International Publication No. WO2020249465A1, when the second tool changer part (14) enters or leaves the device holder (44), the device holder (44) does not have any additional force acting on the second tool changer part (14). Thus, the second tool changer part (14) may accidentally drop from the first tool changer (12) due to factors such as vibration or unstable grip. Besides, when the second tool changer part (14) is held by the device holder (44), there is no auxiliary external force acting on the second tool changer part (14), so the second tool changer part (14) is not secured to the device holder (44) stably. In the disclosure of U.K. Patent Application Publication No. GB2292365A, the first unit (1) has a cylinder (3) and a cam (4). A protrudent part (5) of the cam (4) is configured to block an engaging pin (20) of the second unit (2) to prevent the second unit (2) from dropping accidentally. The cylinder (3) is configured to drive the cam (4), so the first unit (1) is large in size.

As disclosed in U.S. Pat. No. 11,130,243B2 titled "Tool coupler, tool changer, tool mounter, and tool change system having the same", the magnet module 40 and the magnetic module 70 are used for coupling between the coupler 20 of the tool 3 and the changer 50, but there is no locking mechanism between them. For example, when the tool 3 is to be hung back to the structure 4 such as a wall, a shelf, etc., the mounter 80 can be used to abut the structure 4, so that the changer 50 can continue to be displaced and separated from the coupler 20; therefore, when the tool 3 works, the coupler 20 may also fall off due to collision with an obstacle without a locking mechanism.

SUMMARY OF THE INVENTION

In view of the above-mentioned shortcomings, the primary object of the present invention is to provide a robotic tool changer system, comprising a first coupling unit, a plurality of second coupling units, and a plurality of tool changer grippers.

The first coupling unit is fixed to or formed with a robot arm end shaft. The first coupling unit has a protruding portion. The protruding portion has a first guide hole extending along a third direction. A first ejector pin is provided in the first guide hole. The first ejector pin provides a first acting force. Each of the second coupling units is connected with a tool. Each second coupling unit has a recess corresponding to the protruding portion. Each second coupling unit includes a movable second ejector pin in the third direction and a movable guide lock. The second ejector pin is driven by the guide lock to extend out of the recess or retract into the recess. Each tool changer gripper includes a third force-applying member and at least one protruding post. Each second coupling unit is detachably connected to a corresponding one of the tool changer grippers.

When the robot arm end shaft drives the first coupling unit to move in a second direction to contact a selected one of the second coupling units, the protruding portion is mated with the recess. An angle is defined between a first direction and the second direction. The robot arm end shaft pulls the first coupling unit and the selected second coupling unit away from the corresponding tool changer gripper along the first direction. The guide lock applies a second acting force to overcome the first acting force to drive the second ejector pin to push the first ejector pin so that the second ejector pin extends into the first guide hole, and the first coupling unit is coupled with the selected second coupling unit. When the robot arm end shaft drives the first coupling unit and the selected second coupling unit to move to the corresponding tool changer gripper along the first direction, the protruding post pushes the guide lock to overcome the second acting force. The first ejector pin pushes the second ejector pin through the first acting force so that the second ejector pin is retracted into the recess. The third force-applying member applies a third acting force to hold the selected second coupling unit. The first coupling unit is moved away from the selected second coupling unit along the second direction.

Preferably, the first coupling unit includes a first periphery and a first contact surface. The first coupling unit has a first mating portion. Each second coupling unit includes a second periphery and a second contact surface. Each second coupling unit has a second mating portion corresponding to the first mating portion. Preferably, the first mating portion is at least one retaining post. The retaining post is located on the first contact surface. The retaining post is gradually tapered toward the second contact surface. The second mating portion is at least one positioning hole. The positioning hole is located on the second contact surface. Alternatively, the first mating portion is an annular groove. The annular groove is located at a junction of the first periphery and the first contact surface. The second mating portion is a flange. The flange is located a junction of the second periphery and the second contact surface. The protruding portion has a chamfer.

Preferably, the third force-applying member includes a first gripping member, a second gripping member, and a force-applying unit. The first gripping member and the second gripping member define an accommodating portion. The accommodating portion includes an end opening. The accommodating portion of each tool changer gripper is configured to accommodate the corresponding second coupling unit. The first gripping member and the second gripping member are movable relative to each other in a first plane. The first plane is constituted by the first direction and the third direction. The first gripping member has a first gripping end. The second gripping member has a second gripping end. The end opening is a gap defined by a distance between the first gripping end and the second gripping end. The force-applying unit acts on the first gripping member or/and the second gripping member. The third acting force is a first planar gripping force of the first gripping end and the second gripping end in the first plane. Preferably, each second coupling unit includes a second periphery. The second periphery is recessed along the first plane with a guide groove. The first gripping end of the first gripping member is provided with a rotatable first roller. The second gripping end of the second gripping member is provided with a rotatable second roller. The first roller and the second roller grip the guide groove in the first plane.

Preferably, the first acting force, the second acting force and the third acting force are an elastic force or a magnetic force.

Preferably, the third force-applying member is a magnetic member. Each second coupling unit includes a magnetically sensitive member. The third acting force is a magnetic force of the magnetic member. The third acting force acts on the magnetically sensitive member so that the corresponding tool changer gripper holds the second coupling unit through the third acting force. Preferably, the magnetic member or the magnetically sensitive member is adjustable in position for changing the third acting force. Preferably, each second coupling unit has a receiving groove corresponding to the magnetic member. The receiving groove includes a threaded section and a straight groove section. The magnetically sensitive member has a perforation. An adjustment screw passes through the perforation and is screwed to the threaded section, so that the position of the magnetically sensitive member is adjustable in the straight groove section.

Preferably, each second coupling unit has at least one guide lock groove to accommodate the guide lock and a second force-applying member. The guide lock has a concave portion and a guide slope. The second ejector pin has a second ejector pin slope corresponding to the guide slope. When the selected second coupling unit is moved away from the corresponding tool changer gripper, the second force-applying member applies the second acting force to drive the guide lock. Through cooperation of the guide slope and the second ejector pin slope, the second ejector pin extends out of the recess to overcome the first acting force and to extend into the first guide hole. When the selected second coupling unit contacts the corresponding tool changer gripper, the protruding post extends into the guide lock groove, the protruding post pushes the guide lock to overcome the second acting force, and the first ejector pin pushes the second ejector pin through the first acting force to move toward the concave portion, so that the second ejector pin is moved out of the first guide hole and retracted into the recess.

Preferably, a first force-applying member in provided in the first guide hole. The first force-applying member applies the first acting force to the first ejector pin. The first force-applying member is a magnetic member or an elastic member. The second force-applying member is a magnetic member or an elastic member.

Preferably, the first coupling unit has a first terminal portion and a second guide hole. A power wire and a signal wire of the robot arm end shaft pass through the second guide hole and are connected to the first terminal portion. Each second coupling unit has a second terminal portion. The second terminal portion is electrically connected to the tool. Through the first terminal portion to be connected to the second terminal portion, power and/or control signals are transmitted between the robot arm end shaft and the tool.

Preferably, the first coupling unit has a first coupling hole, and each second coupling unit has a second coupling hole. A first pipe joint is connected to the first coupling hole of the first coupling unit. A second pipe joint is connected to the second coupling hole of the second coupling unit. When the first coupling unit is coupled with the selected second coupling unit, the first pipe joint and the second pipe joint communicate with each other through the first coupling hole and the second coupling hole. The first coupling hole or/and the second coupling hole is provided with a sealing member.

The present invention further provides a method for performing a tool change with a robotic tool changer system. The method comprises the following steps of: providing a first coupling unit fixed to a robot arm end shaft; providing a plurality of second coupling units each connected with a tool; providing a plurality of tool changer grippers, wherein the second coupling units are detachably connected to the respective tool changer grippers, each second coupling unit has a third acting force; driving the first coupling unit along a second direction with the robot arm end shaft for the first coupling unit to be coupled with a selected one of the second coupling units; driving the first coupling unit coupled with the selected second coupling unit with the robot arm end shaft away from the corresponding tool changer gripper in a first direction, defining an angle between the first direction and the second direction. When the selected second coupling unit is moved to the corresponding tool changer gripper and before the robot arm end shaft drives the first coupling unit to separate from the selected second coupling unit, the third acting force is applied to the selected second coupling unit for restricting movement of the selected second coupling unit along the first direction and the second direction.

Preferably, the angle is between 10 degrees and 170 degrees.

Preferably, the third acting force is a first planar gripping force. The first planar gripping force is applied to the second coupling unit in a first plane. The first plane is constituted by the first direction and a third direction. The third direction is perpendicular to the first direction and the second direction. Preferably, when the second coupling unit is held by the corresponding tool changer gripper, the first planar gripping force has a component force, and the component force is directed toward the corresponding tool changer gripper so that the second coupling unit is tightly against the corresponding tool changer gripper.

Preferably, the third acting force is a magnetic force. When the second coupling unit is held by the corresponding tool changer gripper, the magnetic force attracts the second coupling unit to be tightly against the corresponding tool changer gripper.

According to the above technical features, the present invention achieves the following effects:

1. The first acting force, the second acting force and the third acting force interact with one another, so as to achieve precise mechanical robotic tool changes.
2. In the process of removing or placing the second coupling unit from the tool changer gripper through the first coupling unit fixed to the robot arm end shaft, the third acting force is constantly applied to the second coupling unit. This can prevent the second coupling unit from accidentally dropping when the second coupling unit is not completely taken out or placed in the tool changer gripper.
3. When the second coupling unit is held by the corresponding tool changer gripper, the third acting force is applied to the second coupling unit so that the second coupling unit is tightly held by the corresponding tool changer gripper.
4. Through the corresponding recess and the protruding portion of the first coupling unit and the second coupling unit as well as the corresponding first and second mating portions, the first coupling unit can be accurately aligned with the second coupling unit.
5. The first acting force, the second acting force and the third acting force may be a contact elastic force or a non-contact magnetic force.
6. The second coupling unit and the first coupling unit are coupled with each other by the second ejector pin inserted into the first guide hole. This connection belongs to a structural connection. Compared with the method that relies solely on magnetic force, the structural connection between the second coupling unit and the first coupling unit of the present invention does not have the disadvantage of accidental separation.

BRIEF DESCRIPTION OF THE DRAWINGS

FIG. 10A is a sectional view of FIG. 10;

FIG. 23 is a schematic view of the first embodiment of the present invention, illustrating that when the robot arm end shaft drives the second coupling unit to disengage from the tool changer gripper, the second acting force of the second force-applying member overcomes the force of the spring on the second ejector pin and the first force of the first force-applying member, so that the second ejector pin extends into the first guide hole;

DESCRIPTION OF THE PREFERRED EMBODIMENTS

Embodiments of the present invention will now be described, byway of example only, with reference to the accompanying drawings.

Figure 1:
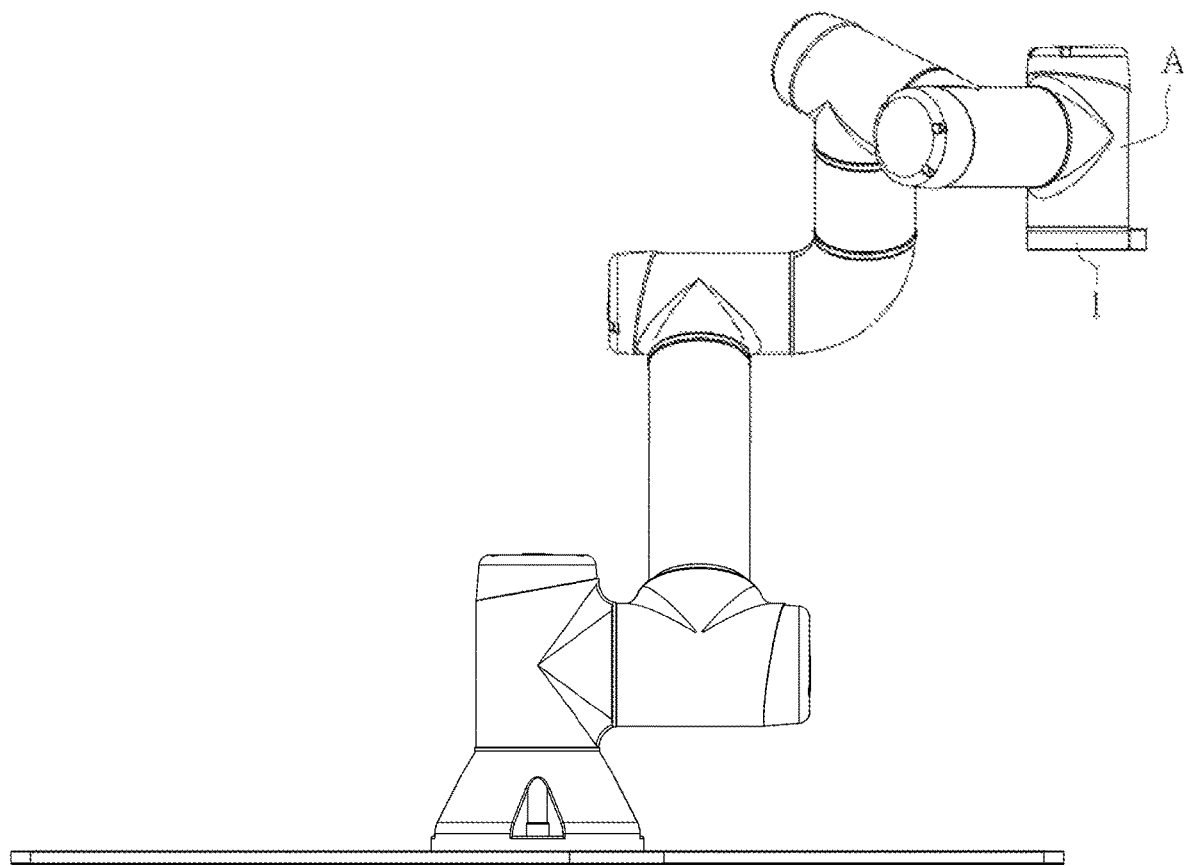
FIG. 1 is a perspective view of the robot arm end shaft coupled with the first coupling unit according to a first embodiment of the present invention.
Figure 2:
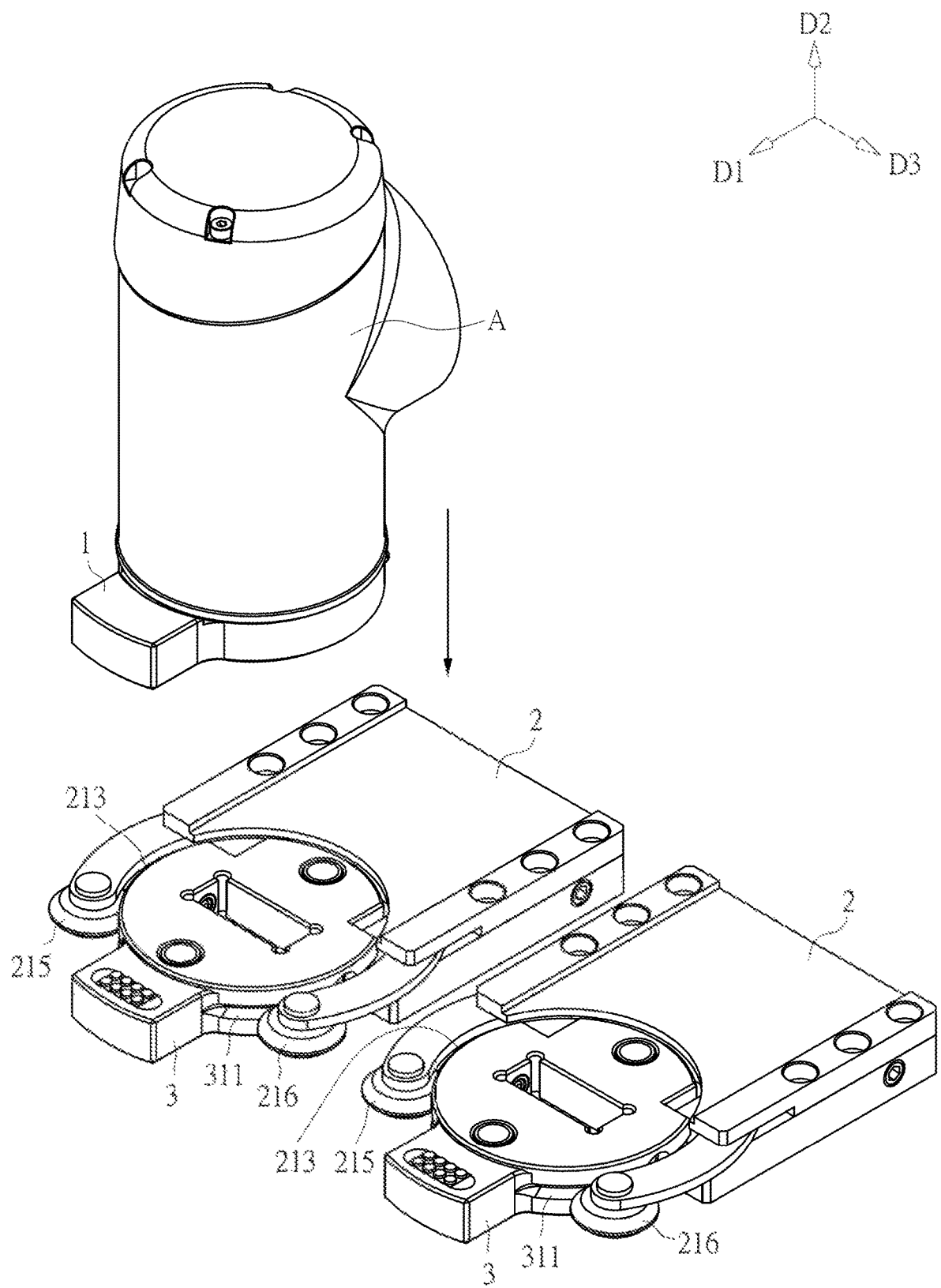
FIG. 2 is a perspective view of the first embodiment of the present invention, illustrating that the first coupling unit is driven by the robot arm end shat to the second coupling units on the tool changer grippers.
Figure 3:
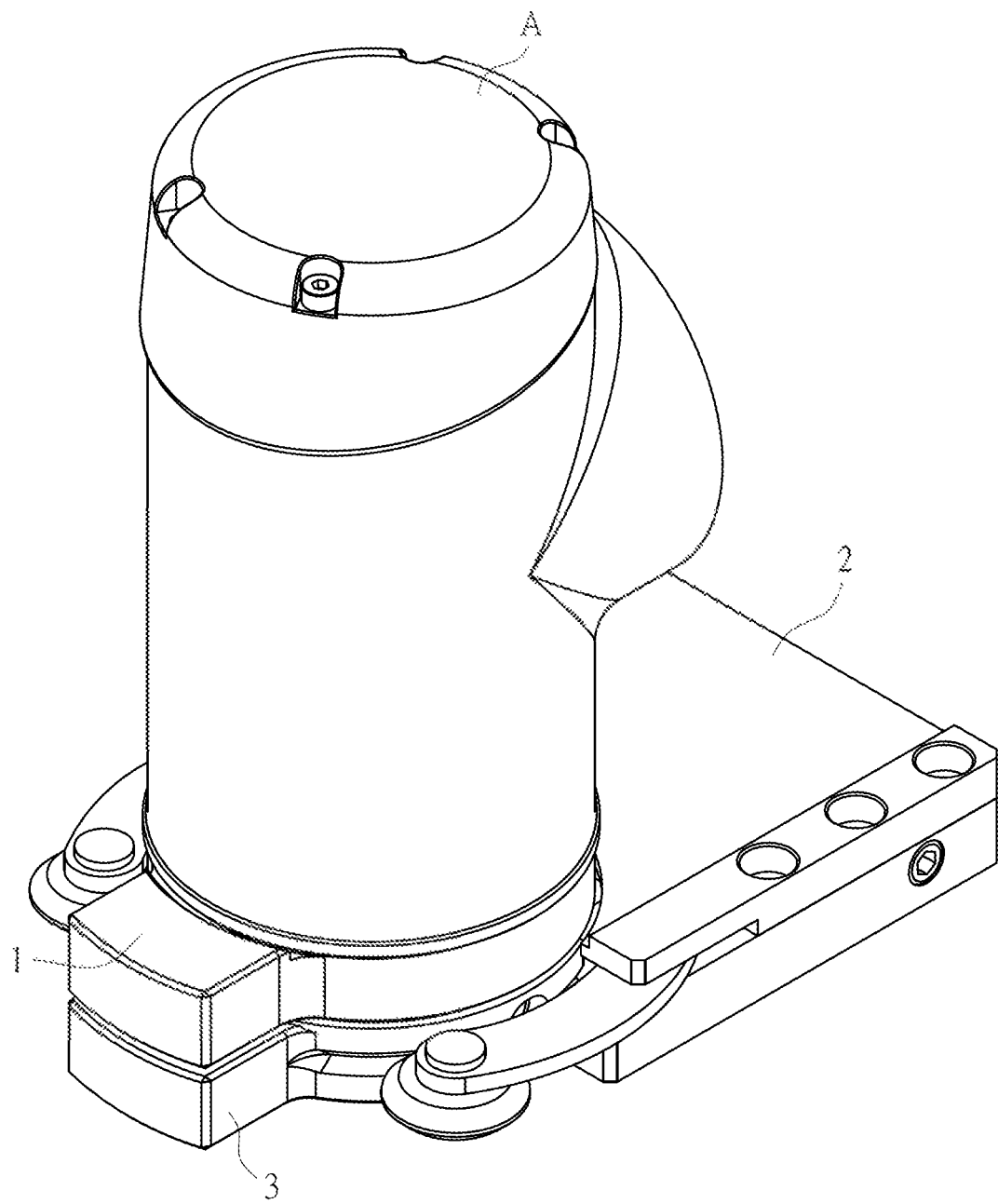
FIG. 3 is a perspective view of the first embodiment of the present invention, illustrating that the first coupling unit driven by the robot arm end shaft is coupled with the second coupling unit.
Figure 4:
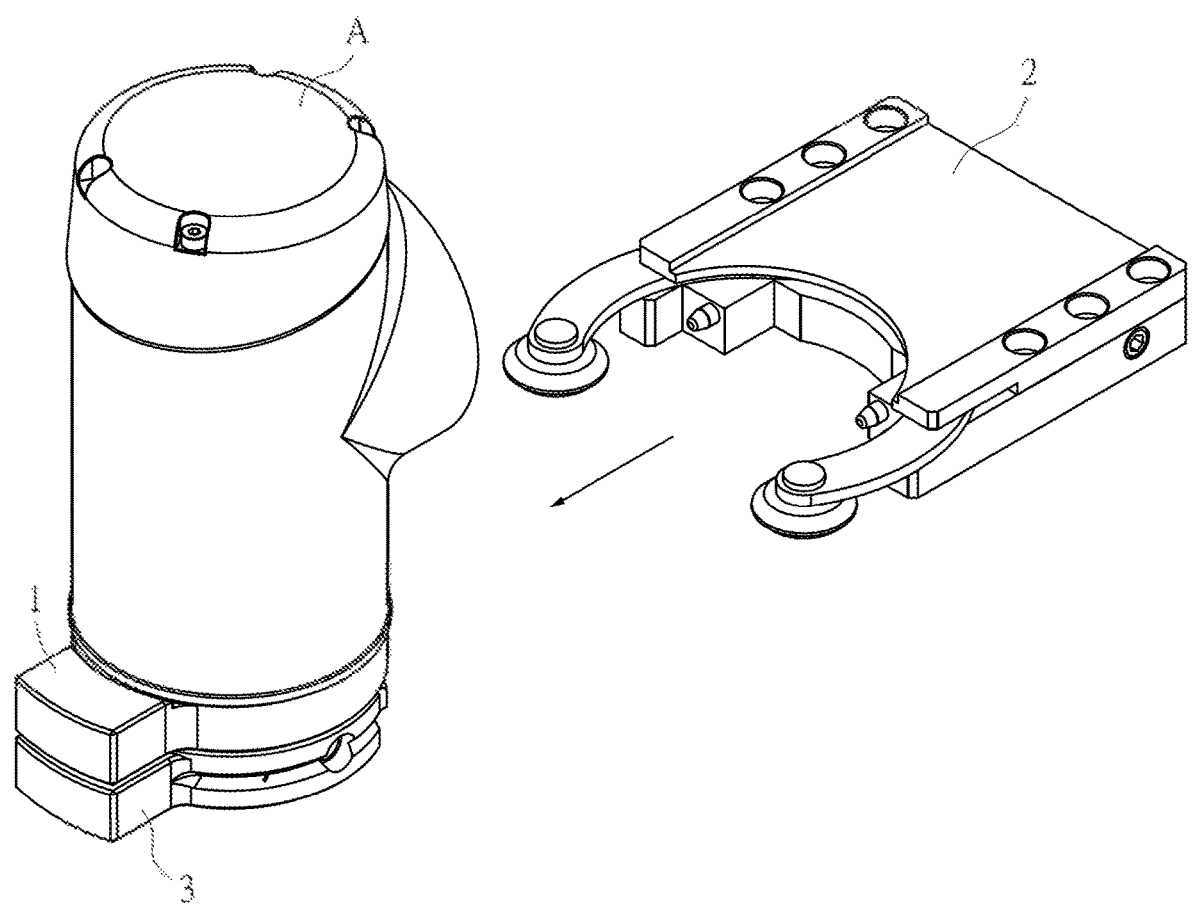
FIG. 4 is a perspective view of the first embodiment of the present invention, illustrating that the second coupling unit that is coupled with the first coupling unit by the robot arm end shaft is taken out of the tool changer gripper.

As shown in FIG. 1, a robotic tool changer system of a first embodiment of the present invention is implemented by a robot arm end shaft A. Specifically, the robot arm end shaft A is coupled with a first coupling unit 1, or the first coupling unit 1 extends out from the robot arm end shaft A. For example, the first coupling unit 1 is formed on the robot arm end shaft A. The first coupling unit 1 of this embodiment is coupled to the robot arm end shaft A. Referring to FIGS. 2 to 4, the robot arm end shaft A performs a tool change in a tool magazine through the first coupling unit 1. The tool magazine has a plurality of tool changer grippers 2. Referring to FIGS. 2-4, one of the tool changer grippers 2 is taken as an example. A second coupling unit 3 is disposed on each tool changer gripper 2. For example, a machining tool is fixed to the second coupling unit 3. (The method of coupling the tool to the second coupling unit 3 may be the coupling method of the conventional tool changer, so the tool is not shown in the figures). The robot arm end shaft A is operated to approach the tool changer gripper 2 in a second direction D2 for the first coupling unit 1 to be coupled with the second coupling unit 3. Then, the robot arm end shaft A takes out the second coupling unit 3 coupled with the coupling unit 1 from the tool changer gripper 2 along a first direction D1. In this embodiment, a third direction D3 is perpendicular to the first direction D1 and the second direction D2. The first direction D1 and the third direction D3 constitute a first plane. In this embodiment, the angle between the first direction D1 and the second direction D2 is 90 degrees, but not limited thereto. The angle may be between 10 degrees and 170 degrees. The first direction D1, the second direction D2, the third direction D3 and the first plane described in the embodiments of the present invention are only used to describe the spatial position and direction of the embodiments, and are not intended to limit the protection scope of the present invention.

Figure 5:
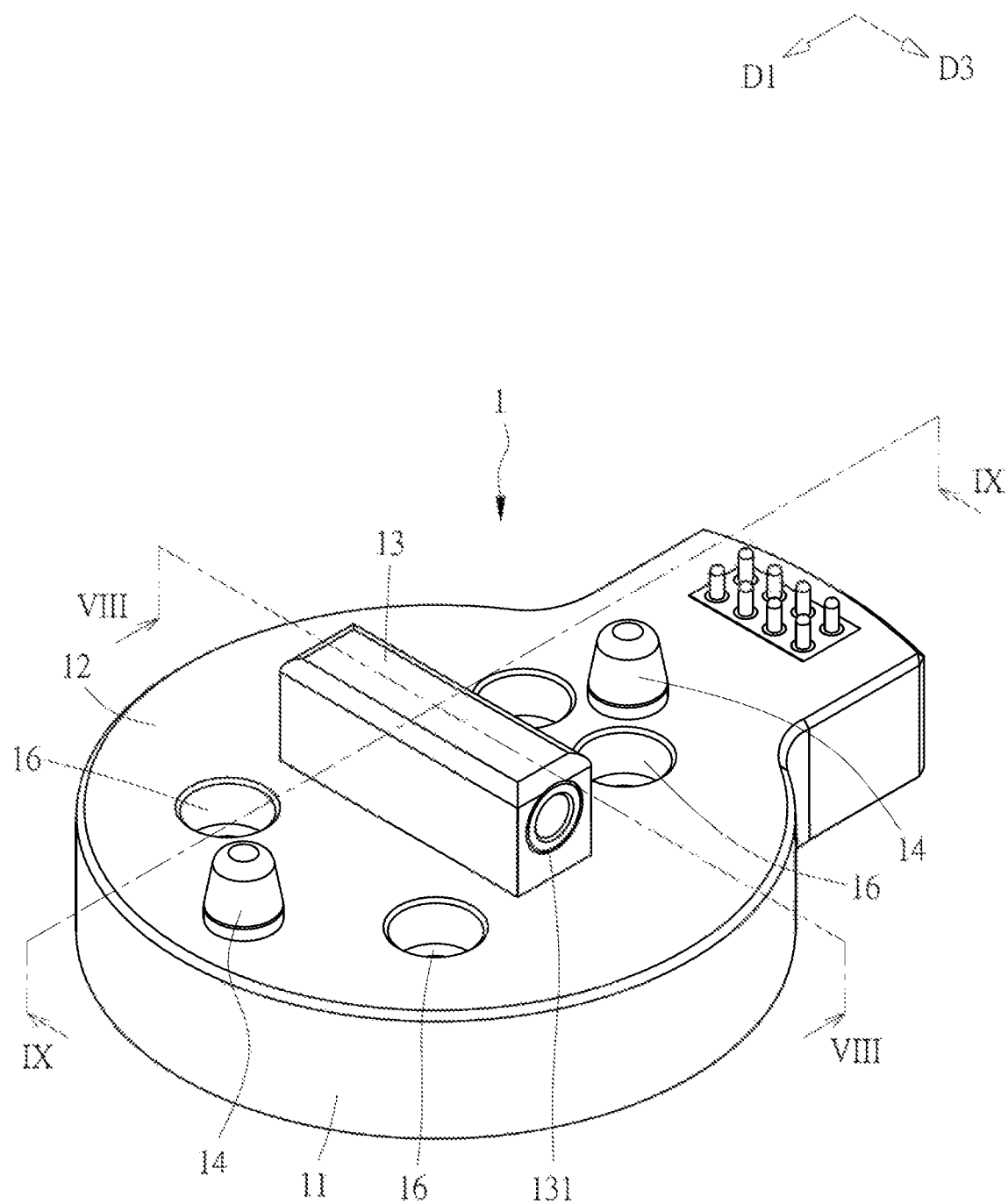
FIG. 5 is a perspective view of the first coupling unit of the first embodiment of the present invention.
Figure 6:
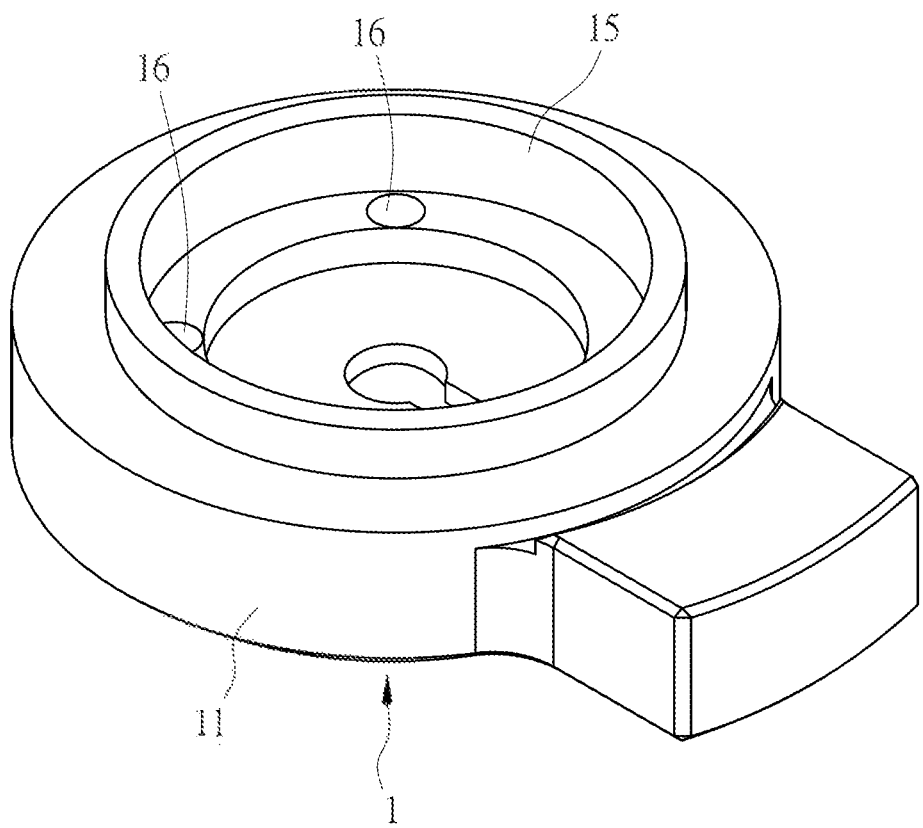
FIG. 6 is another perspective view of the first coupling unit of the first embodiment of the present invention.
Figure 7:
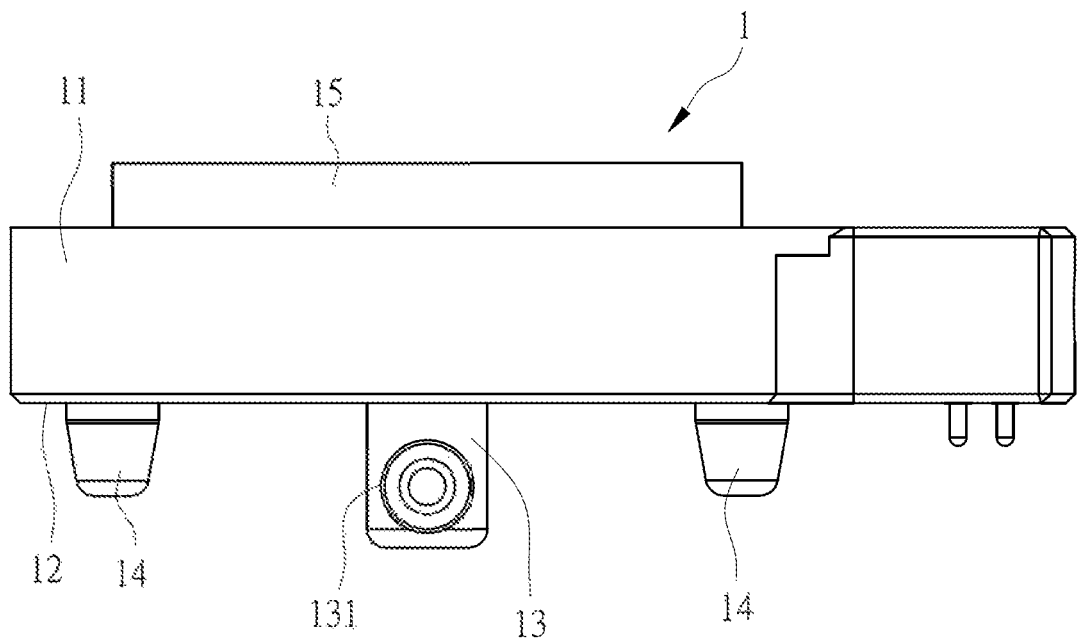
FIG. 7 is a side view of the first coupling unit of the first embodiment of the present invention.
Figure 8:
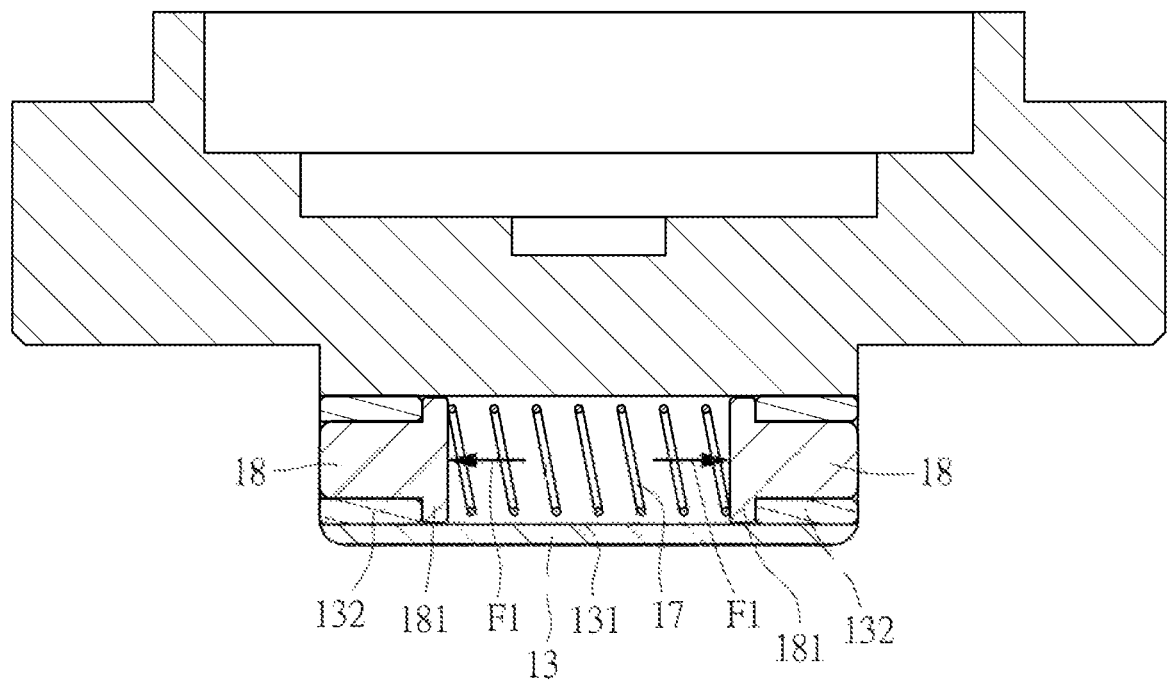
FIG. 8 is a sectional view of FIG. 5.
Figure 9:
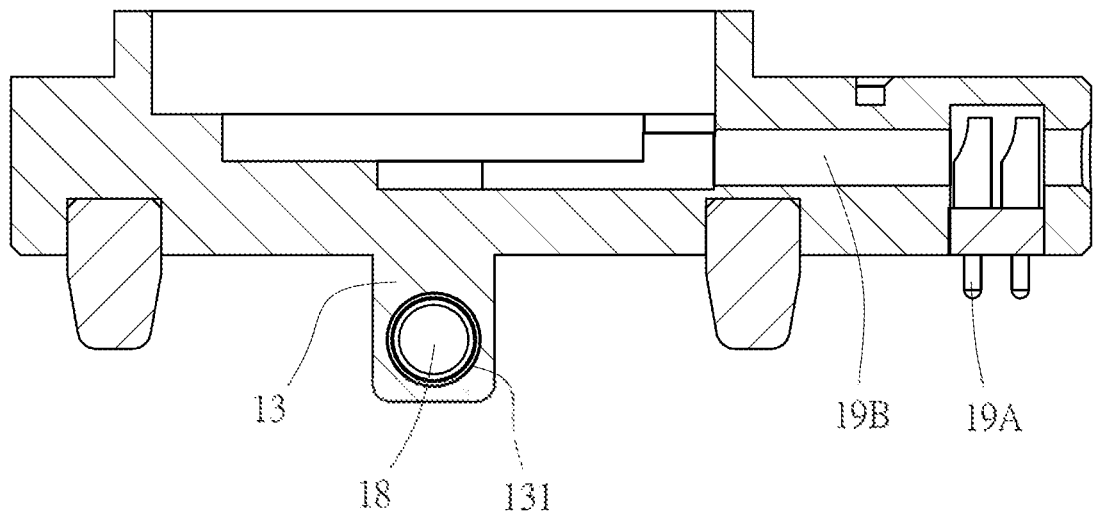
FIG. 9 is a sectional view of FIG. 5.

Referring to FIGS. 5-7, the first coupling unit 1 includes a first periphery 11 and a first contact surface 12. A protruding portion 13 and a first mating portion 14 are provided on the first contact surface 12. The protruding portion 13 protrudes along a transverse direction D11. In this embodiment, the first mating portion is two retaining posts. The retaining post is gradually tapered. The first coupling unit 1 further has a retaining ring 15 located on a surface opposite to the first contact surface 12. The first coupling unit 1 has a through hole 16. Through the retaining ring 15, the first coupling unit 1 is secured to the robot arm end shaft A (as shown in FIG. 1), and then a screw is screwed into the through hole 16 to fix the first coupling unit 1 to the robot arm end shaft A. Referring to FIG. 8 and FIG. 9, the protruding portion 13 has a first guide hole 131 extending along the third direction D3. A first force-applying member 17 is provided in the middle section of the first guide hole 131. In this embodiment, the first force-applying member 17 is an elastic member. A first ejector pin 18 is provided in either end of the first guide hole 131. The first ejector pin 18 is against the first force-applying member 17, so that the first force-applying member 17 applies a first acting force F1 to the first ejector pin 18. An end of the first ejector pin 18 has an ejector pin flange 181. A sleeve 132 is secured to either end of the first guide hole 131. The ejector pin flange 181 is against the sleeve 132, so that the first ejector pin 18 won't come out of the first guide hole 131. The first coupling unit 1 further has a first terminal portion 19A and a second guide hole 19B. A power wire and a signal wire of the robot arm end shaft A (as shown in FIG. 1) pass through the second guide hole 19B and are connected to the first terminal portion 19A.

Figure 10:
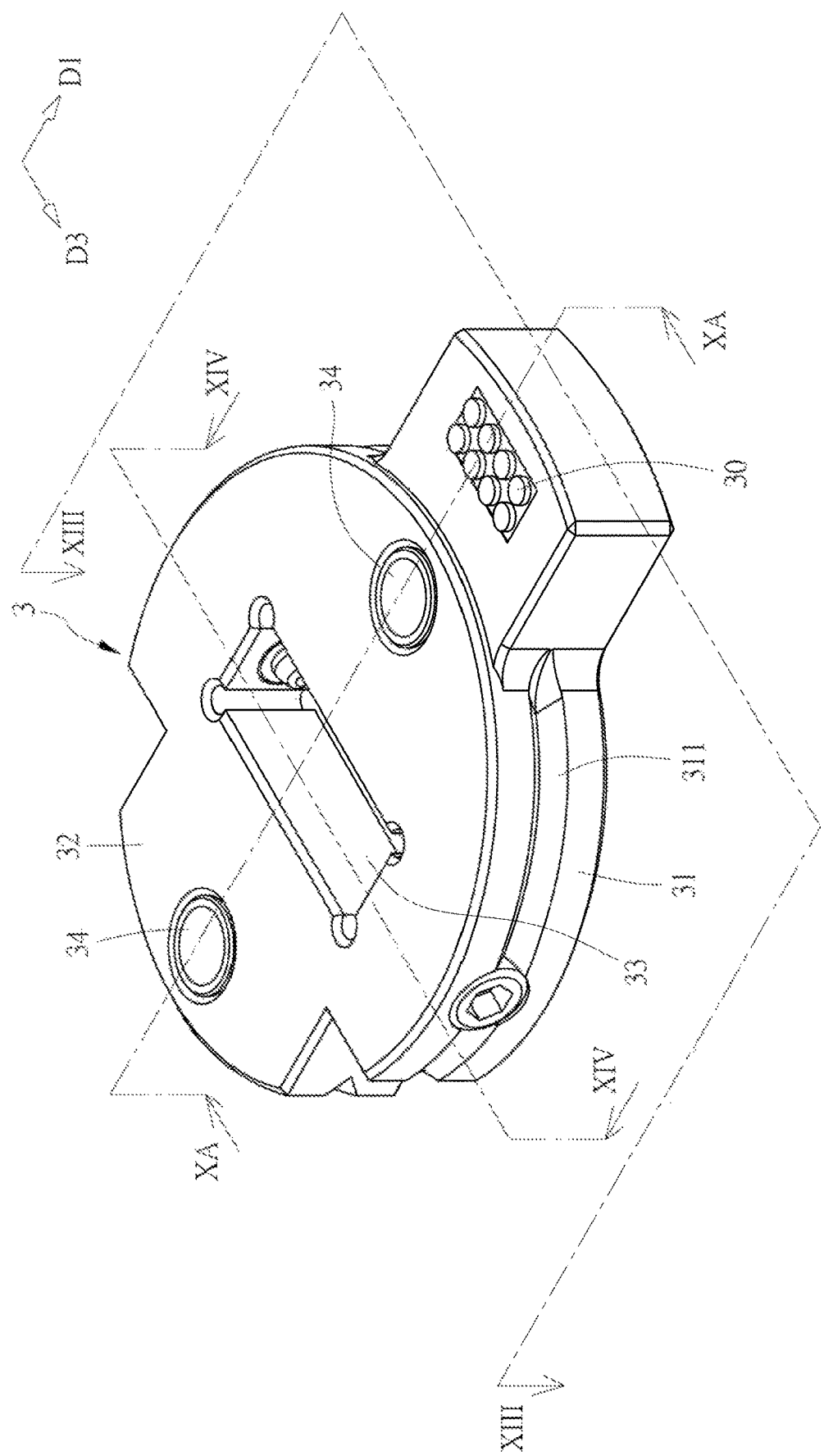
FIG. 10 is a perspective view of the second coupling unit of the first embodiment of the present invention.
Figure 11:
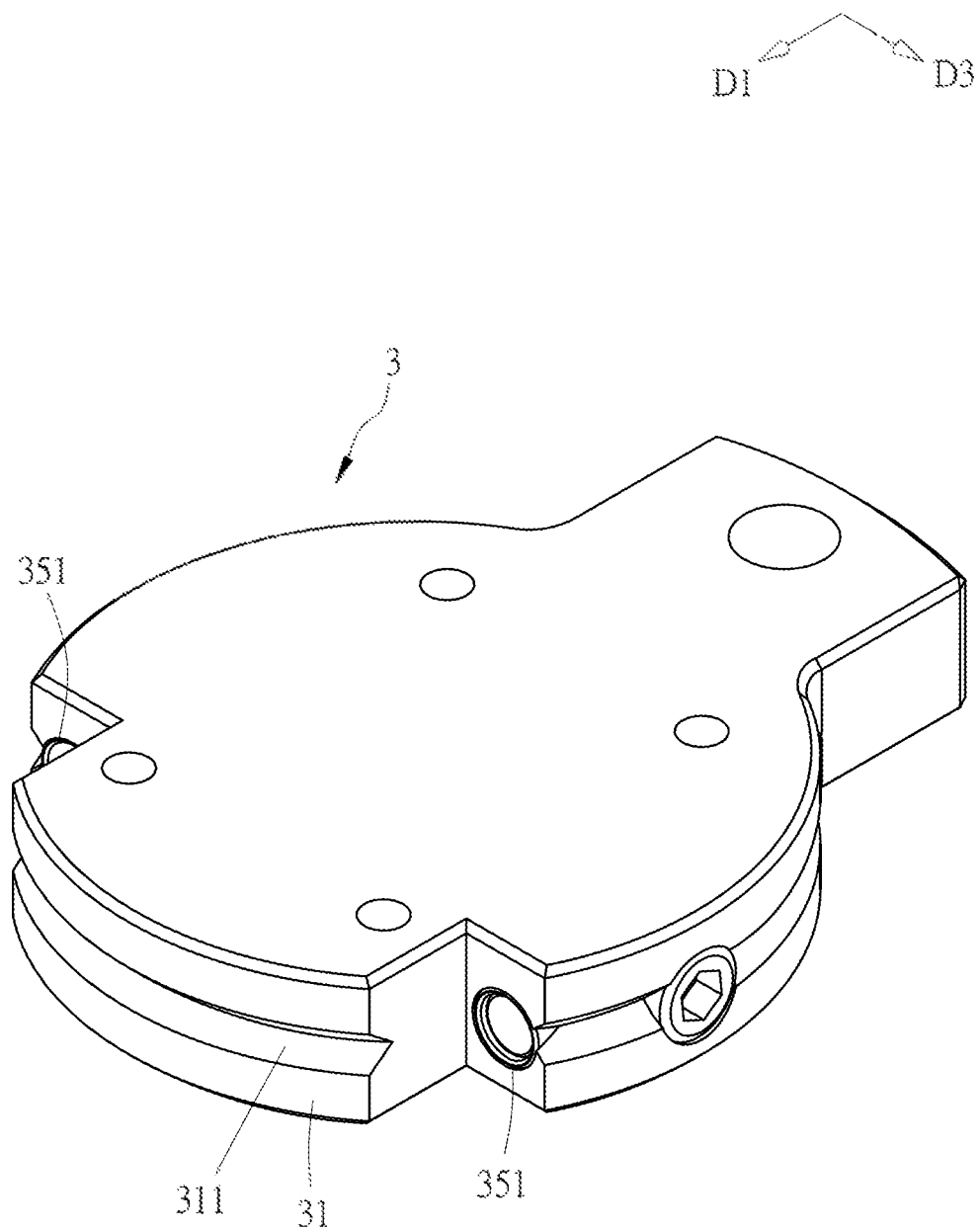
FIG. 11 is another perspective view of the second coupling unit of the first embodiment of the present invention.
Figure 12:
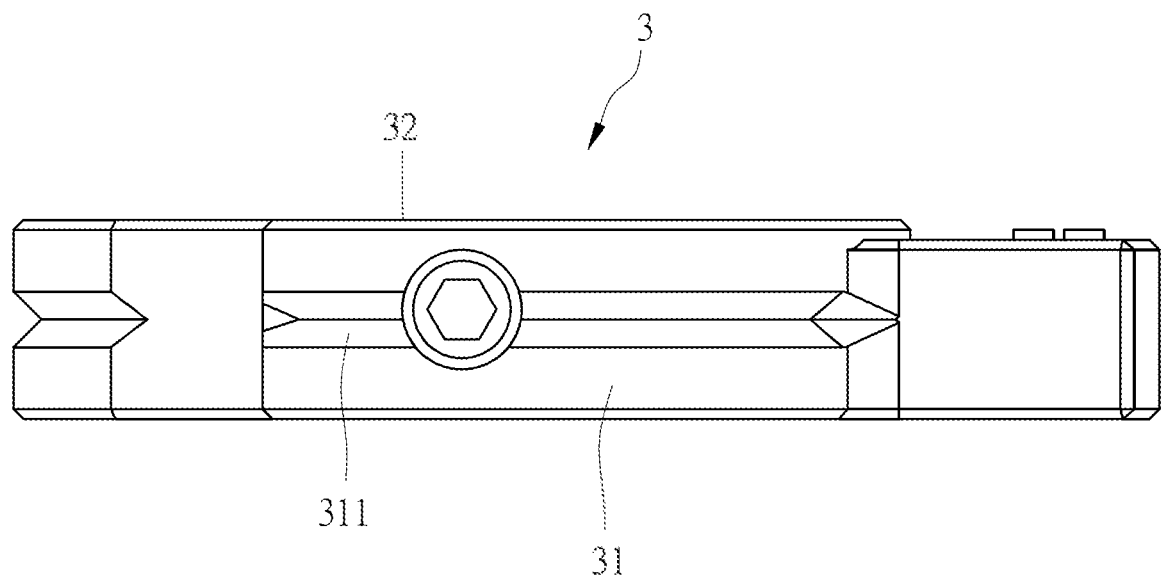
FIG. 12 is a side view of the second coupling unit of the first embodiment of the present invention.
Figure 13:
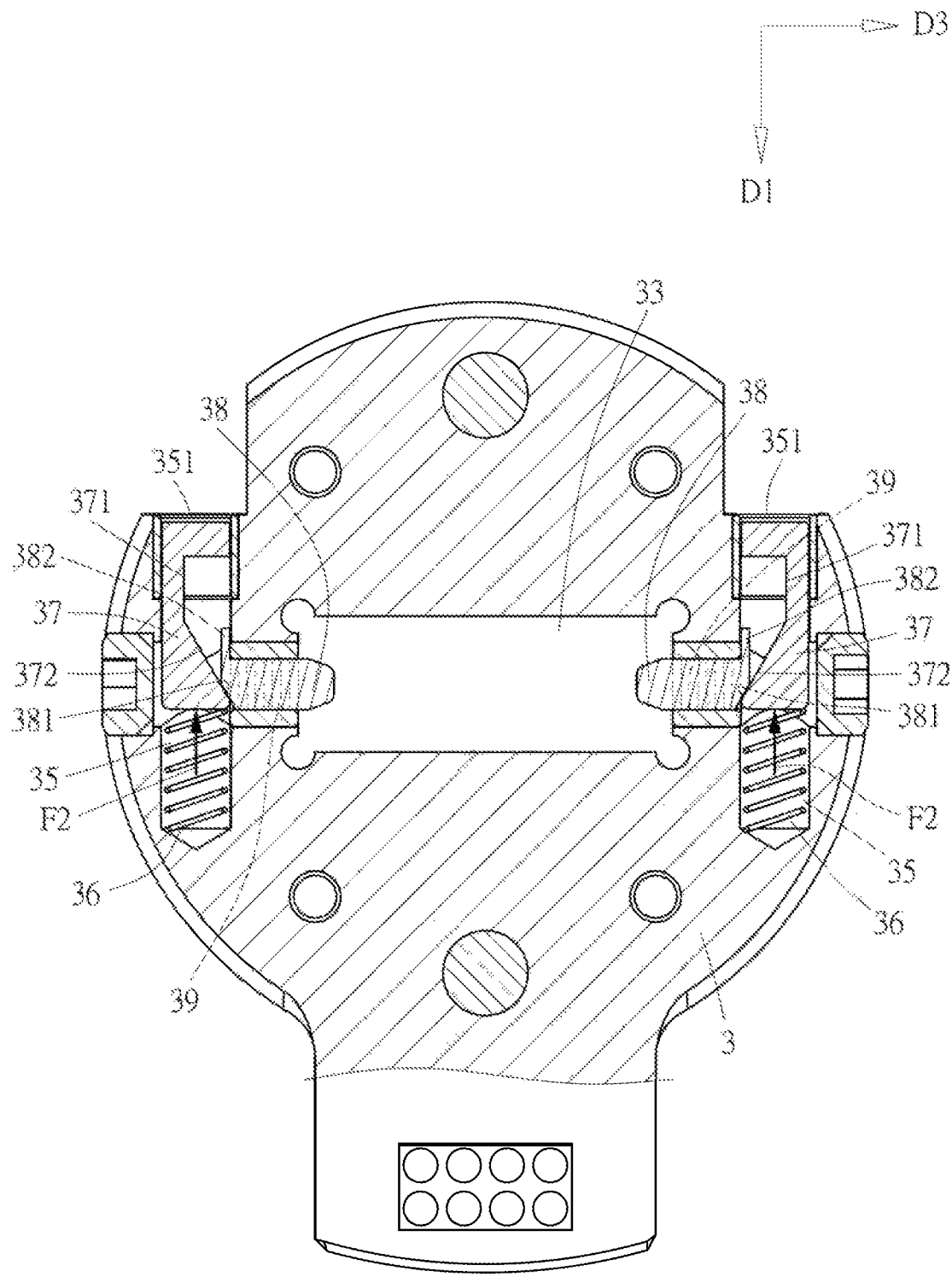
FIG. 13 is a sectional view of FIG. 10.
Figure 14:
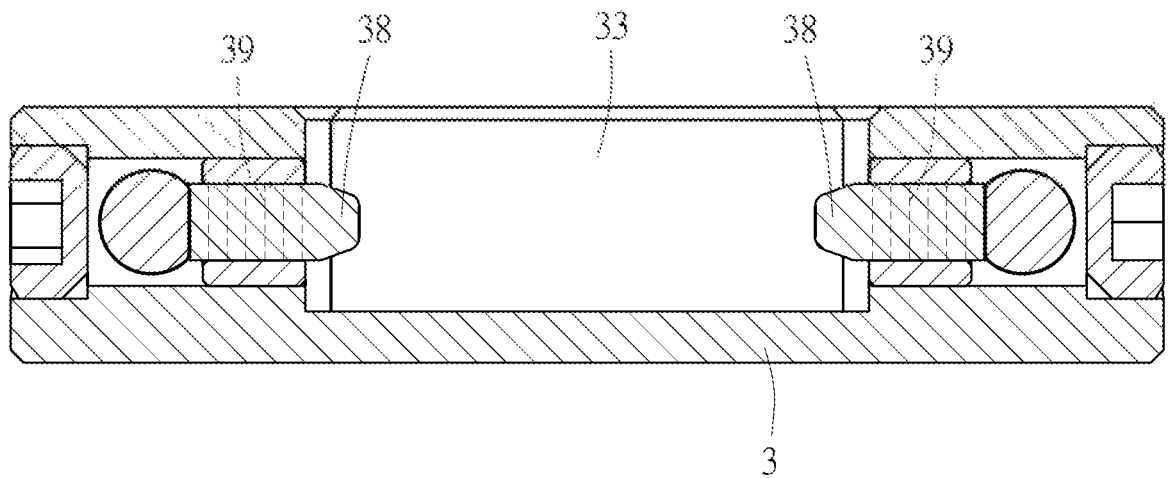
FIG. 14 is a sectional view of FIG. 10.

Referring to FIGS. 10-12, the second coupling unit 3 includes a second periphery 31 and a second contact surface 32. The second periphery 31 is recessed along the first plane with a guide groove 311. The second contact surface 32 is provided with a recess 33 corresponding to the protruding portion 13 (as shown in FIG. 5) and a second mating portion 34 corresponding to the first mating portion 14 (as shown in FIG. 5). In this embodiment, the second mating portion 34 is two positioning holes corresponding to the retaining posts. In this embodiment, the width of the guide groove 311 is gradually decreased from the second periphery 31 toward the recess 33. The guide groove 311 is approximately right-angled on the cross section in the second direction D2. Referring to FIG. 11, FIG. 13 and FIG. 14, each of two opposite sides of the second coupling unit 3 is recessed with a guide lock groove 35 in the first direction D1. The guide lock groove 35 has an opening 351 on the second periphery 31. A second force-applying member 36 and a guide lock 37 are sequentially provided in the guide lock groove 35. In this embodiment, the second force-applying member 36 is an elastic member, such as a spring. The guide lock 37 has a concave portion 371 and a guide slope 372. The second coupling unit 3 is provided with a second ejector pin 38 in the third direction D3. The second ejector pin 38 can be extended to either side of the recess 33 or retracted into the second coupling unit 3. Specifically, the second ejector pin 38 has a second ejector pin slope 381 corresponding to the guide slope 372 of the guide lock 37. A spring 39 is sleeved on the second ejector pin 38. The spring 39 provides a force for the second ejector pin 38 to be retracted into the second coupling unit 3. A blocking rim 382 is provided at one end of the second ejector pin 38 away from the recess 33. The blocking rim 382 is against the guide lock groove 35 to restrict the second ejector pin 38 from extending to the extreme position of the recess 33. The second force-applying member 36 applies a second acting force F2 to the second ejector pin 38 for the second ejector pin 38 to extend out into the recess 33 through the cooperation of the guide slope 372 and the second ejector pin slope 381. Referring to FIG. 10 and FIG. 10A, a second terminal portion 30 is provided on the second coupling unit 3. The second terminal portion 30 is configured to contact the first terminal portion 19A of the first coupling unit 1. The second terminal portion 30 is electrically connected to the tool.

Figure 15:
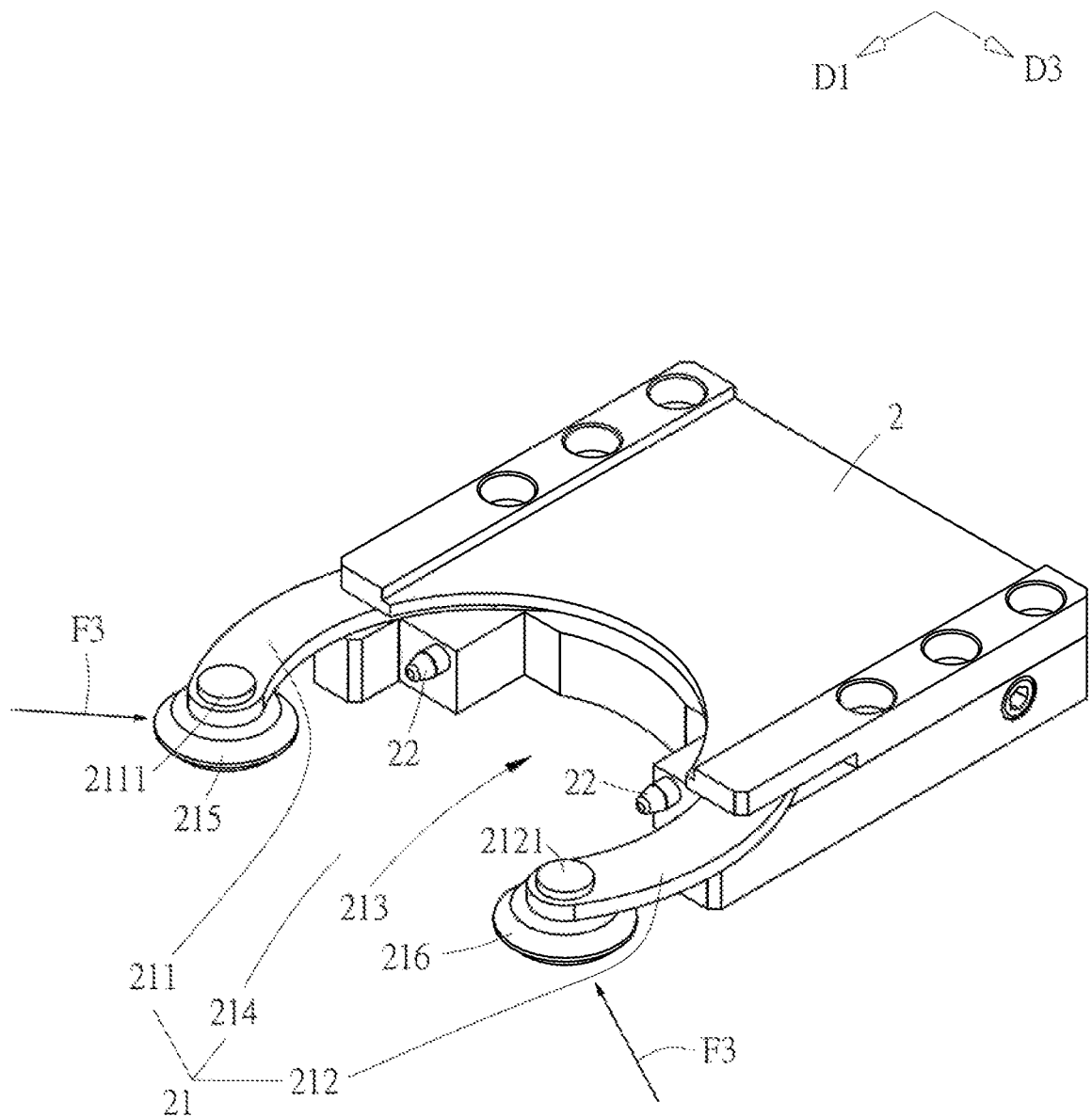
FIG. 15 is a perspective view of the tool changer gripper of the first embodiment of the present invention.
Figure 16:
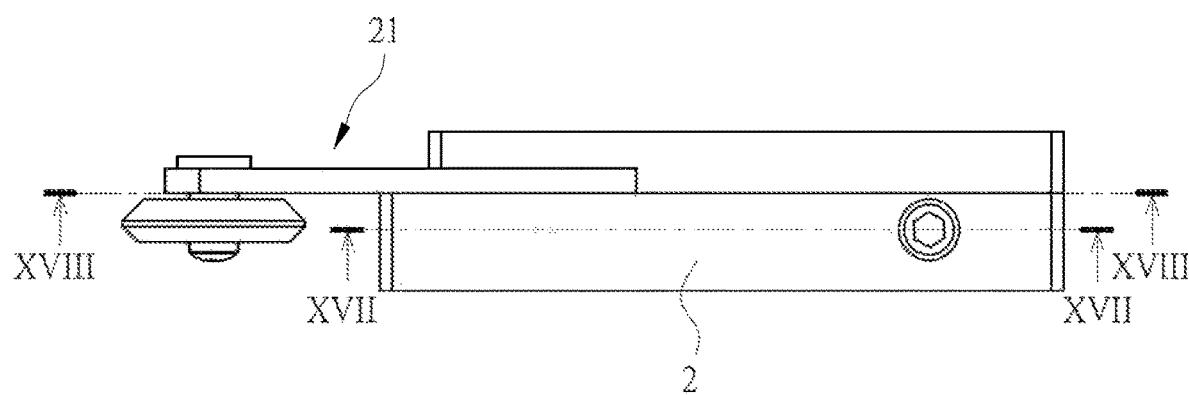
FIG. 16 is a side view of the tool changer gripper of the first embodiment of the present invention.
Figure 17:
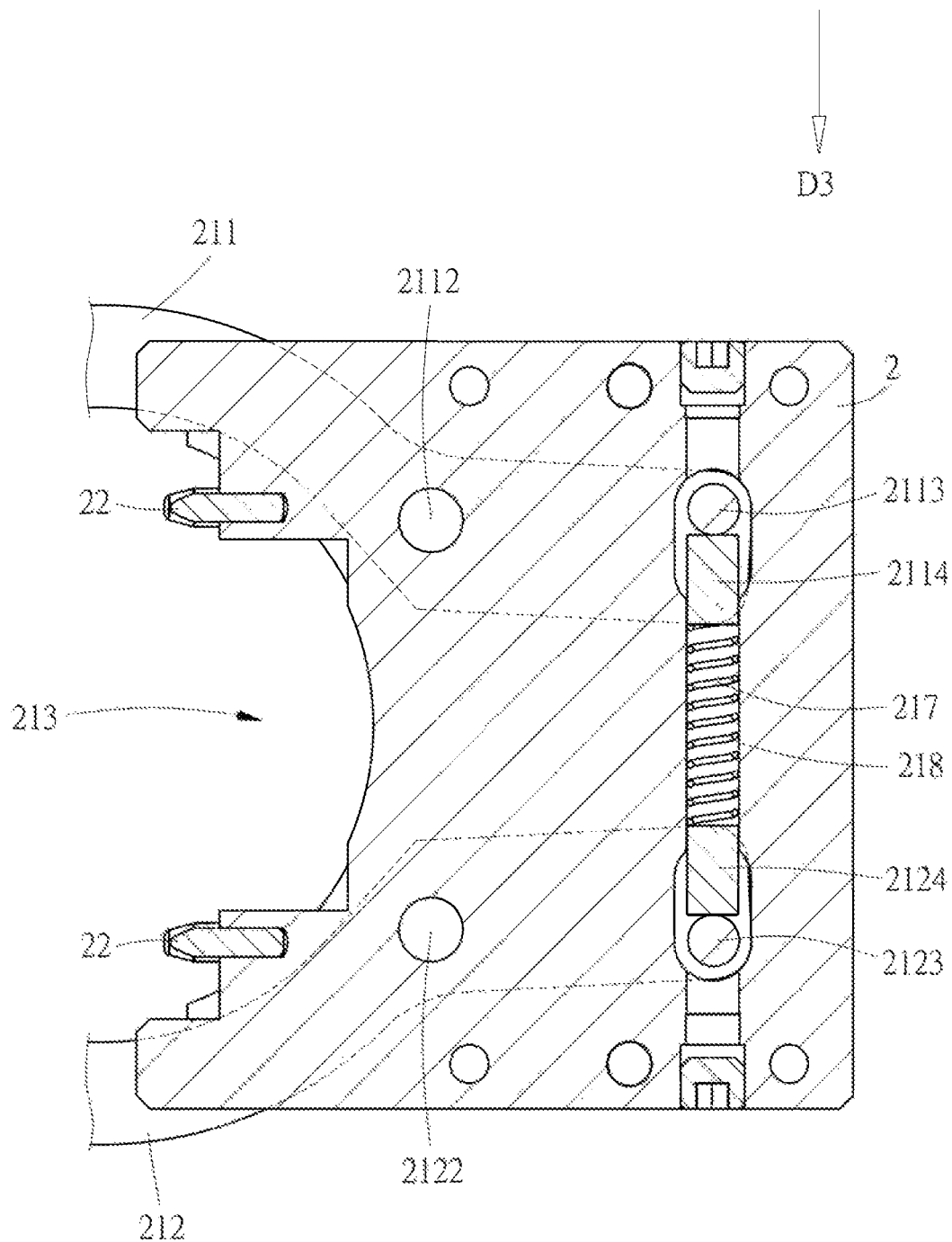
FIG. 17 is a sectional view of FIG. 16.
Figure 18:
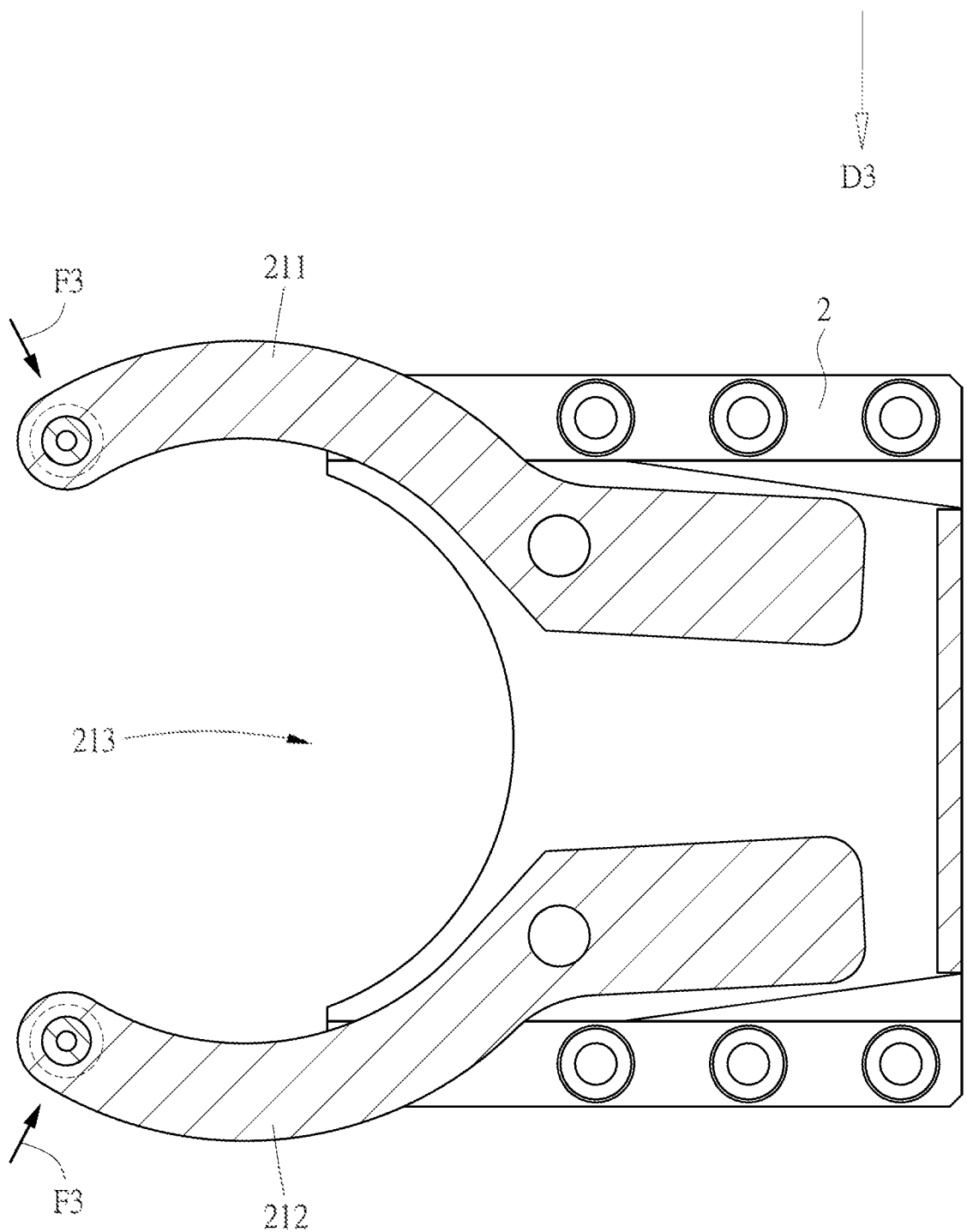
FIG. 18 is a sectional view of FIG. 16.

Referring to FIG. 15 and FIG. 16, the tool changer gripper 2 includes a third force-applying member 21 to provide a third acting force F3 and a protruding post 22 corresponding to the guide lock groove 35 (as shown in FIG. 11 and FIG. 13). In this embodiment, the third force-applying member 21 includes a first gripping member 211 and a second gripping member 212. The exposed portions of the first gripping member 211 and the second gripping member 212 define an accommodating portion 213. The accommodating portion 213 includes an end opening 214. The first gripping member 211 and the second gripping member 212 are movable relative to each other in the first plane. The first gripping member 211 has a first gripping end 2111. The second gripping member 212 has a second gripping end 2121. The end opening 214 is a gap defined by the distance between the first gripping end 2111 and the second gripping end 2121. The first gripping end 2111 is provided with a rotatable first roller 215. The second gripping end 2121 is provided with a rotatable second roller 216. Referring to FIG. 17 and FIG. 18, the first gripping member 211 is pivotally connected to the rest of the tool changer gripper 2 by a first pin 2112. The other end of the first gripping member 211, opposite to the first gripping end 2111, is provided with a first force-receiving member 2113. The second gripping member 212 is pivotally connected to the rest of the tool changer gripper 2 by a second pin 2122. The other end of the second gripping member 212, opposite to the second gripping end 2121, is provided with a second force-receiving member 2123. The third force-applying member 21 further includes a force-applying unit 217. As shown in FIG. 17, the force-applying unit 217 is a spring. The tool changer gripper 2 has an accommodating groove 218 along the third direction D3. The spring is accommodated in the accommodating groove 218. The third acting force F3 acts on a first pushing member 2114 and a second pushing member 2124 through the force-applying unit 217. Then, the first pushing member 2114 and the second pushing member 2124 apply a force to the first gripping member 211 or/and the second gripping member 212, so that the first gripping member 211 and the second gripping member 212 have a first planar gripping force toward the accommodating portion 213. In this embodiment, the first planar gripping force is applied in the first plane.

Figure 19:
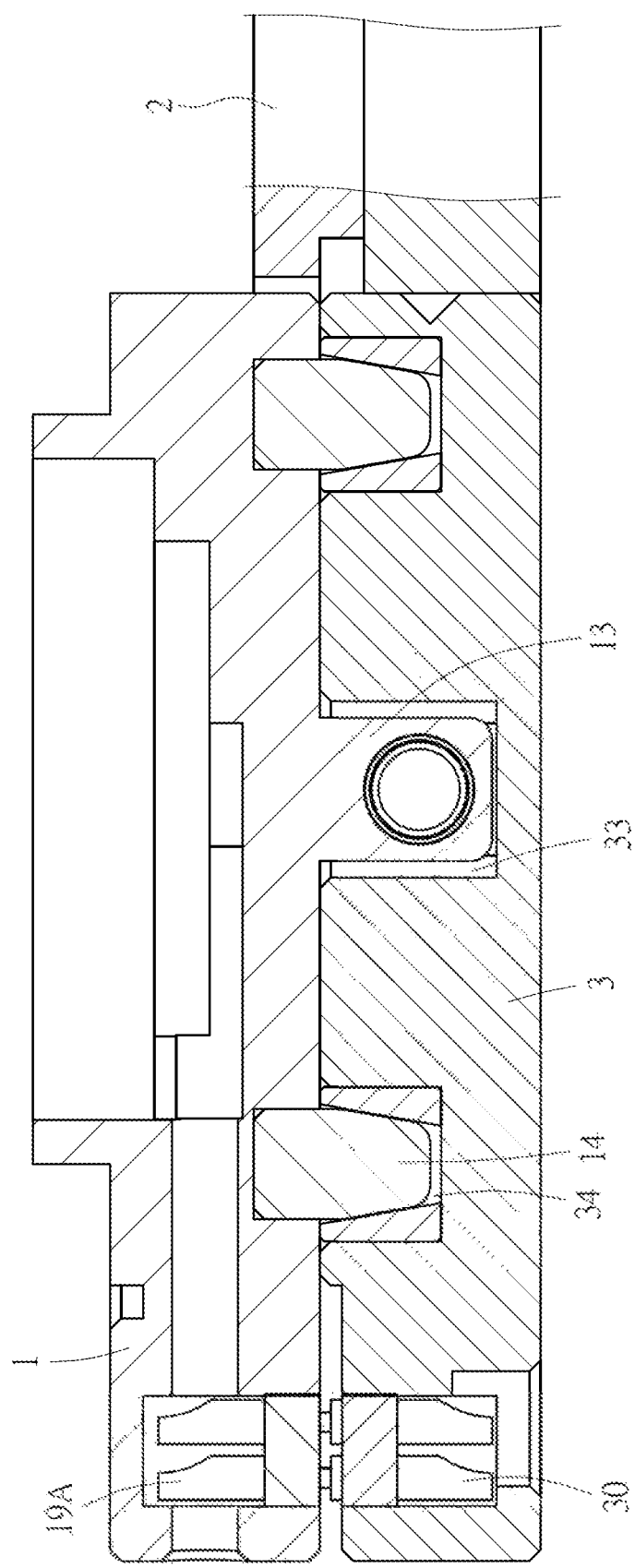
FIG. 19 is a schematic view of the first embodiment of the present invention, illustrating that when the robot arm end shaft drives the first coupling unit to contact the selected second coupling unit held by the tool changer gripper, the first coupling unit and the second coupling unit can be accurately coupled through the protruding portion and the recess that are mated with each other as well as the first mating portion and the second mating portion that are mated with each other.
Figure 20:
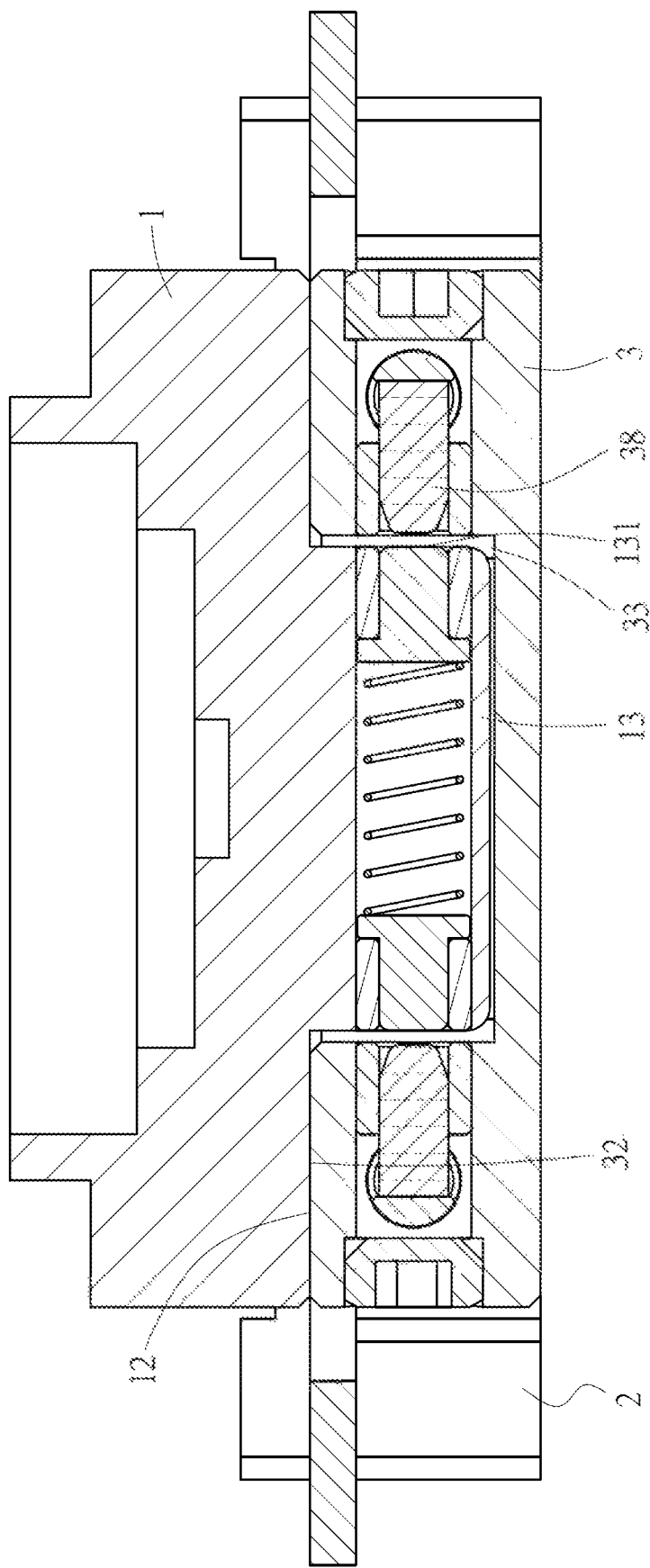
FIG. 20 is a schematic view of the first embodiment of the present invention, illustrating that when the robot arm end shaft drives the first coupling unit to contact the selected second coupling unit held by the tool changer gripper, the second ejector pin of the second coupling unit is aligned with the first ejector pin of the first coupling unit and the second ejector pin has not been extended into the first guide hole.
Figure 21:
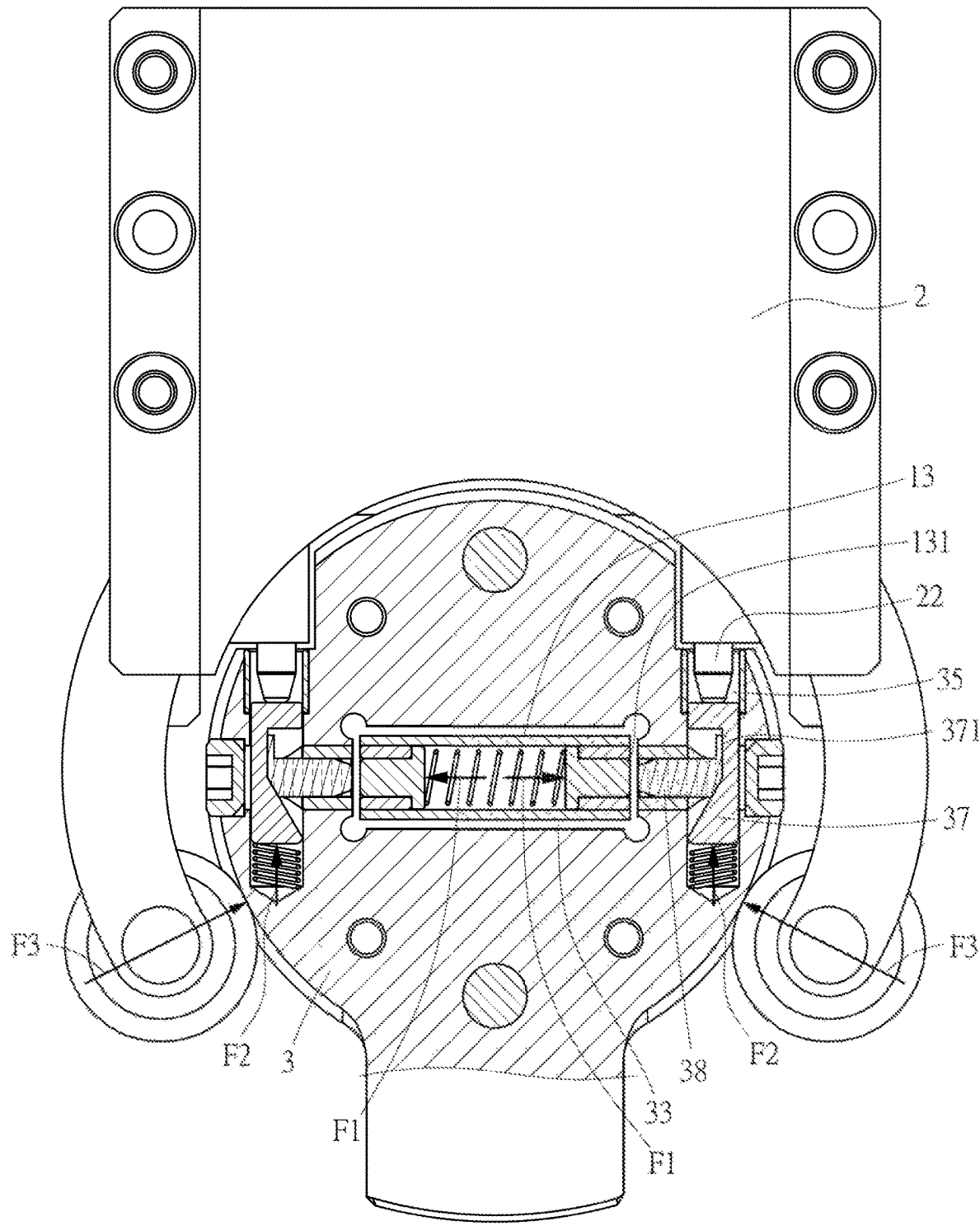
FIG. 21 is a schematic view of the first embodiment of the present invention, illustrating that when the robot arm end shaft drives the first coupling unit to contact the selected second coupling unit held by the tool changer gripper, the first acting force of the first force-applying member, the second acting force of the second force-applying member and the third acting force of the third force-applying member interact with one another.

Referring to FIG. 2, when the second coupling unit 3 is held by the tool changer gripper 2, the accommodating portion 213 of the tool changer gripper 2 is configured to accommodate the second coupling unit 3. The first roller 215 and the second roller 216 grip the guide groove 311 in the first direction D1, and stably grip the second coupling unit 3 through the third acting force F3. Referring to FIGS. 19-21, when the second coupling unit 3 is held by the tool changer gripper 2, the protruding post 22 of the tool changer gripper 2 extends into the guide lock groove 35 of the second coupling unit 3 and push the guide lock 37 to overcome the second acting force F2, so that the second ejector pin 38 is located in the concave portion 371 and retracted in the second coupling unit 3. When the robot arm end shaft A (as shown in FIG. 1) drives the first coupling unit 1 to the second coupling unit 3, the protruding portion 13 is mated with the recess 33, the first mating portion 14 is mated with the second mating portion 34, so that the first contact surface 12 of the first coupling unit 1 is in contact with the second contact surface 32 of the second coupling unit 3, and the second ejector pin 38 is aligned with the first guide hole 131 of the protruding portion 13.

Figure 2A:
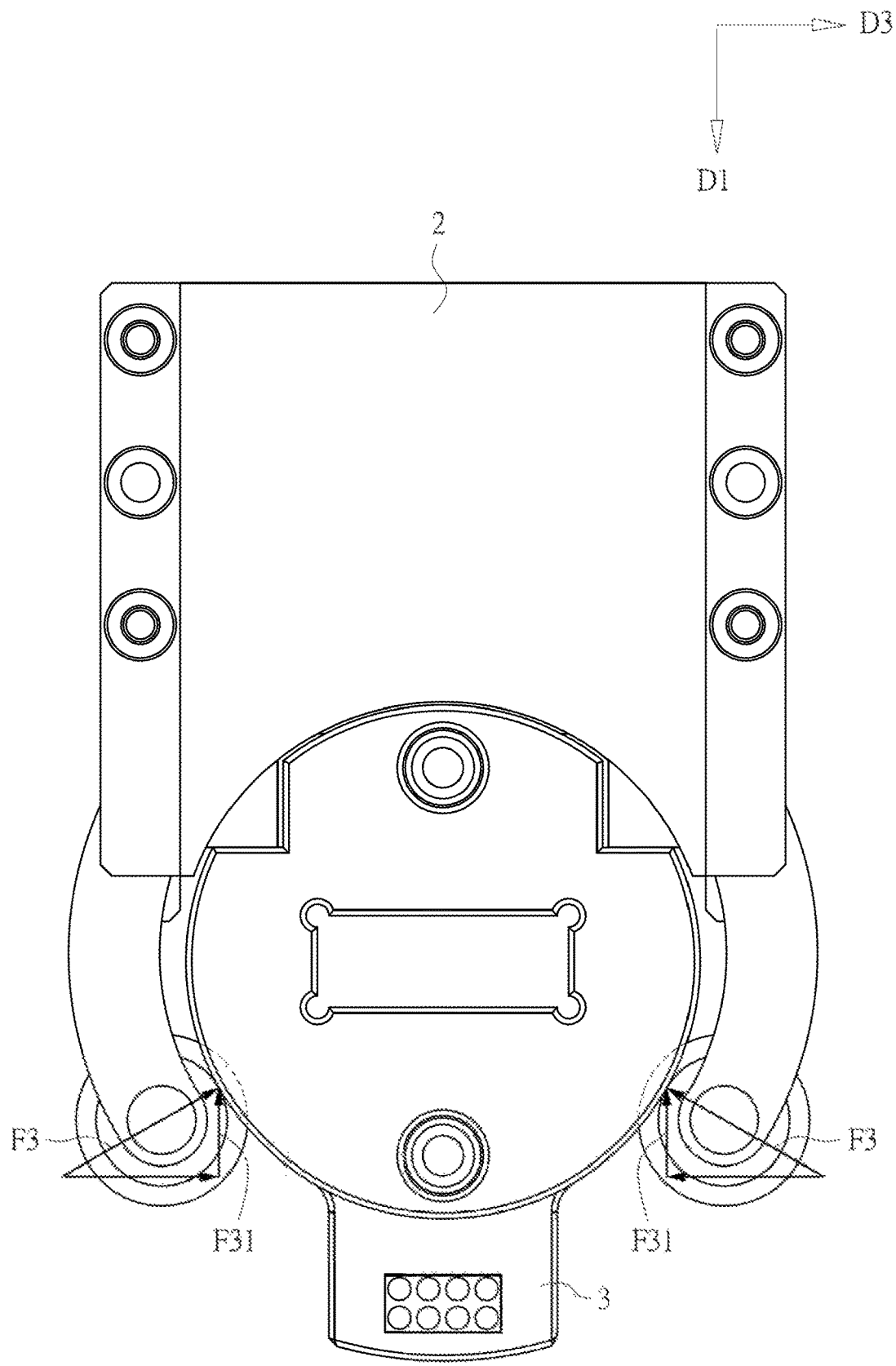
FIG. 2A is a planar schematic view of the first embodiment of the present invention, illustrating that the second coupling unit is held by the tool changer gripper.
Figure 22:
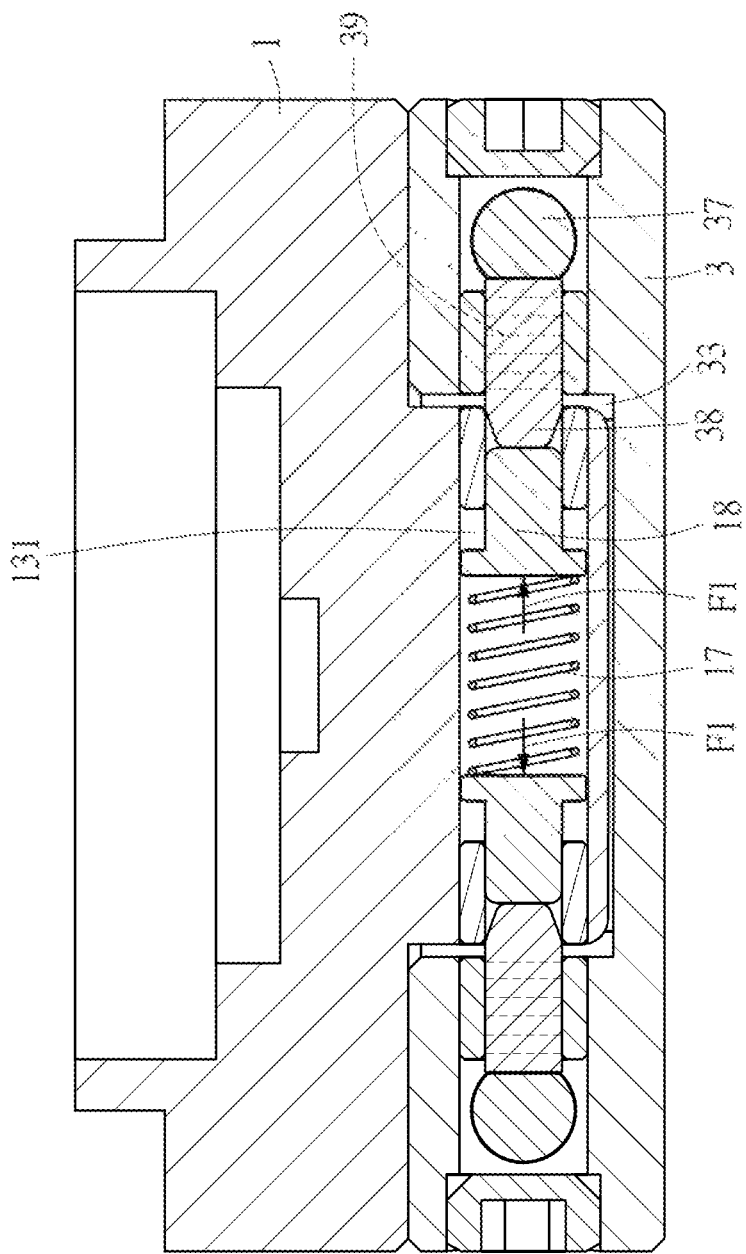
FIG. 22 is a schematic view of the first embodiment of the present invention, illustrating that when the robot arm end shaft drives the second coupling unit to disengage from the tool changer gripper, the second ejector pin extends into the first guide hole to connect the first coupling unit to the second coupling unit.

Referring to FIG. 22 and FIG. 23, when the robot arm end shall A (as shown in FIG. 1) pulls the first coupling unit 1 and the second coupling unit 3 along the first direction D1 to disengage from the tool changer gripper 2, the second coupling unit 3 is disengaged from the protruding post 22 of the tool changer gripper 2, so that the second force-applying member 36 applies the second acting force F2 to the guide lock 37 again. The second acting force F2 is greater than the force applied by the spring 39 to the second ejector pin 38 and the first acting force F1 applied by the first force-applying member 17 to the first ejector pin 18. Thus, through the cooperation of the guide slope 372 of the guide lock 37 and the second ejector pin slope 381 of the second ejector pin 38, the second ejector pin 38 extends from the recess 33 into the first guide hole 131. Thereby, the first coupling unit 1 is coupled with the second coupling unit 3. When the first coupling unit 1 is coupled with the second coupling unit 3, the first terminal portion 19A is connected to the second terminal portion 30 so that power and/or control signals can be transmitted between the robot arm end shaft A (as shown in FIG. 1) and the tool. When the second coupling unit 3 is to be decoupled from the first coupling unit 1, the robot arm end shaft A (as shown in FIG. 1) drives the first coupling unit 1 and the second coupling unit 3 along the first direction D1 to move toward the tool changer gripper 2. At this time, the protruding post 22 extends from the opening 351 of the guide lock groove 35 into the guide lock groove 35 and pushes the guide lock 37 to overcome the second acting force F2, so that the second acting force F2 no longer acts on the second ejector pin 38. Therefore, the first ejector pin 18 pushes the second ejector pin 38 through the first acting force F1, in cooperation with the force exerted on the second ejector pin 38 by the spring 39, so that the second ejector pin 38 is retracted out of the first guide hole 131 and into the second coupling unit 3. Thereby, the connection relationship between the first coupling unit 1 and the second coupling unit 3 is released, so that the robot arm end shaft A (as shown in FIG. 1) can drive the first coupling unit 1 away from the second coupling unit 3 in the second direction D2. Through the aforementioned operations, the first acting force F1, the second acting force F2 and the third acting force F3 interact with one another, so as to achieve precise mechanical robotic tool changes. As shown in FIG. 2A, when the second coupling unit 3 is held by the tool changer gripper 2, the third acting force F3 has a component force F31 in the first direction D1. The component force F31 is directed toward the tool changer gripper 2 so that the second coupling unit 3 is tightly against the tool changer gripper 2 to restrict the movement of the second coupling unit 3 in the first direction D1 and the second direction D2. As shown in FIG. 2 and FIG. 2A, in the tool change process, when the first coupling unit 1 is to take the second coupling unit 3 away from the tool changer gripper 2 and before the second coupling unit 3 completely leaves the tool changer gripper 2, the second coupling unit 3 is always tightly gripped through the third acting force F3 to prevent the second coupling unit 3 from dropping. When the first coupling unit 1 brings the second coupling unit 3 to enter the tool changer gripper 2 and after the second coupling unit 3 is in contact with the tool changer gripper 2, the second coupling unit 3 is always tightly gripped through the third acting force F3 to prevent the second coupling unit 3 from dropping in the tool change process.

Figure 24:
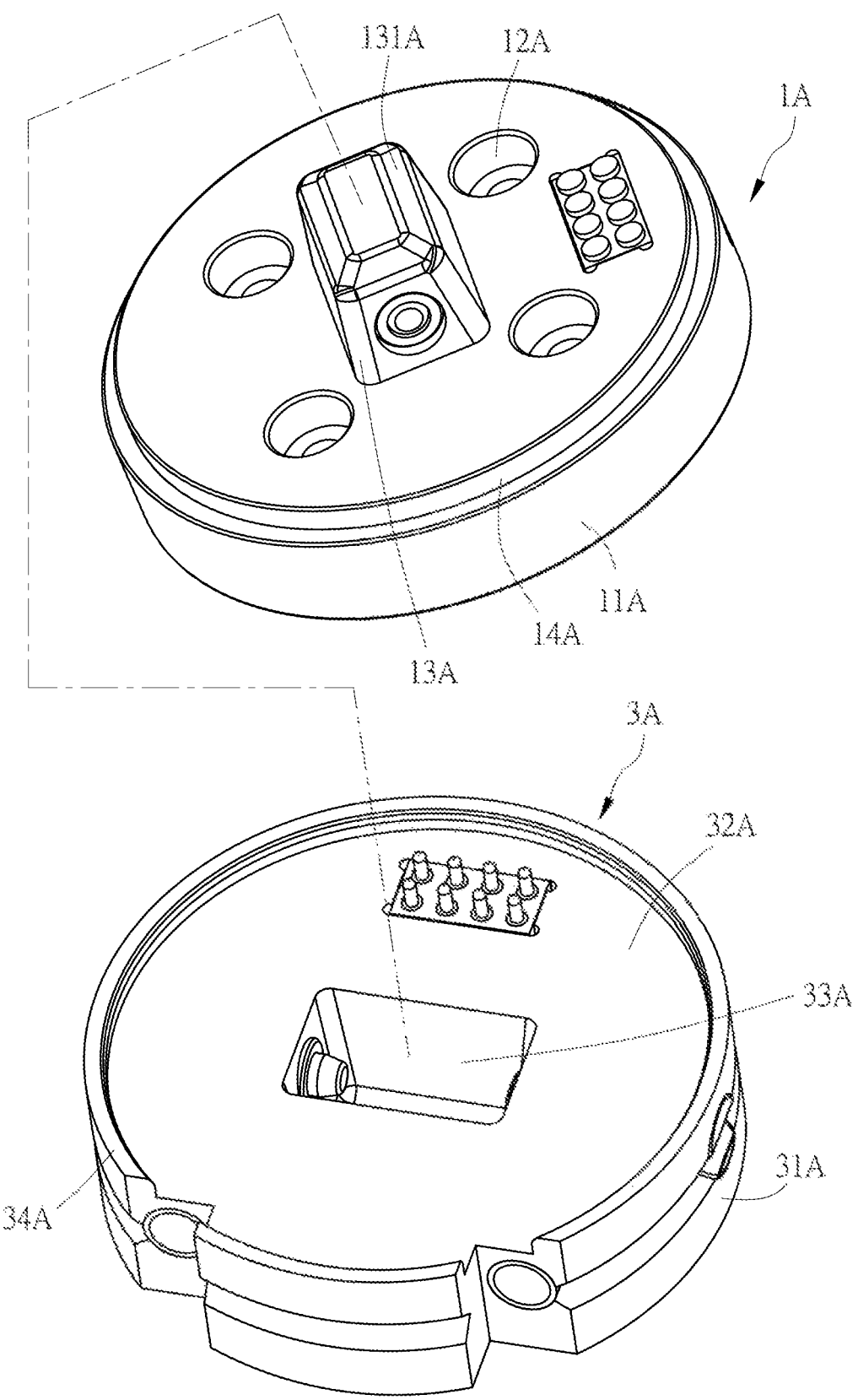
FIG. 24 is a perspective view of the first coupling unit and the second coupling unit according to a second embodiment of the present invention.

FIG. 24 illustrates a second embodiment of the robotic tool changer system of the present invention. The operation method of the second embodiment is substantially the same as that of the first embodiment. The second embodiment is substantially similar to the first embodiment with the exceptions described hereinafter. This embodiment comprises a first coupling unit 1A and a second coupling unit 3A to be coupled with the first coupling unit 1A. The first coupling unit 1A includes a first periphery 11A and a first contact surface 12A. A protruding portion 13A and a first mating portion 14A are provided on the first contact surface 12A. The protruding portion 13A has a chamfer 131A. The first mating portion 14A is an annular groove. The annular groove is located at the junction of the first periphery 11A and the first contact surface 12A. The second coupling unit 3A includes a second periphery 31A and a second contact surface 32A. The second contact surface 32A is provided with a recess 33A corresponding to the protruding portion 13A and a second mating portion 34A corresponding to the first mating portion 14A. The second mating portion 34A is a flange corresponding to the annular groove. In this embodiment, through the chamfer 131A on the protruding portion 13A as well as the corresponding annular groove and the flange of the first mating portion 14A and the second mating portion 34A, the first coupling unit 1A and the second coupling unit 1A are accurately coupled with each other.

Figure 25:
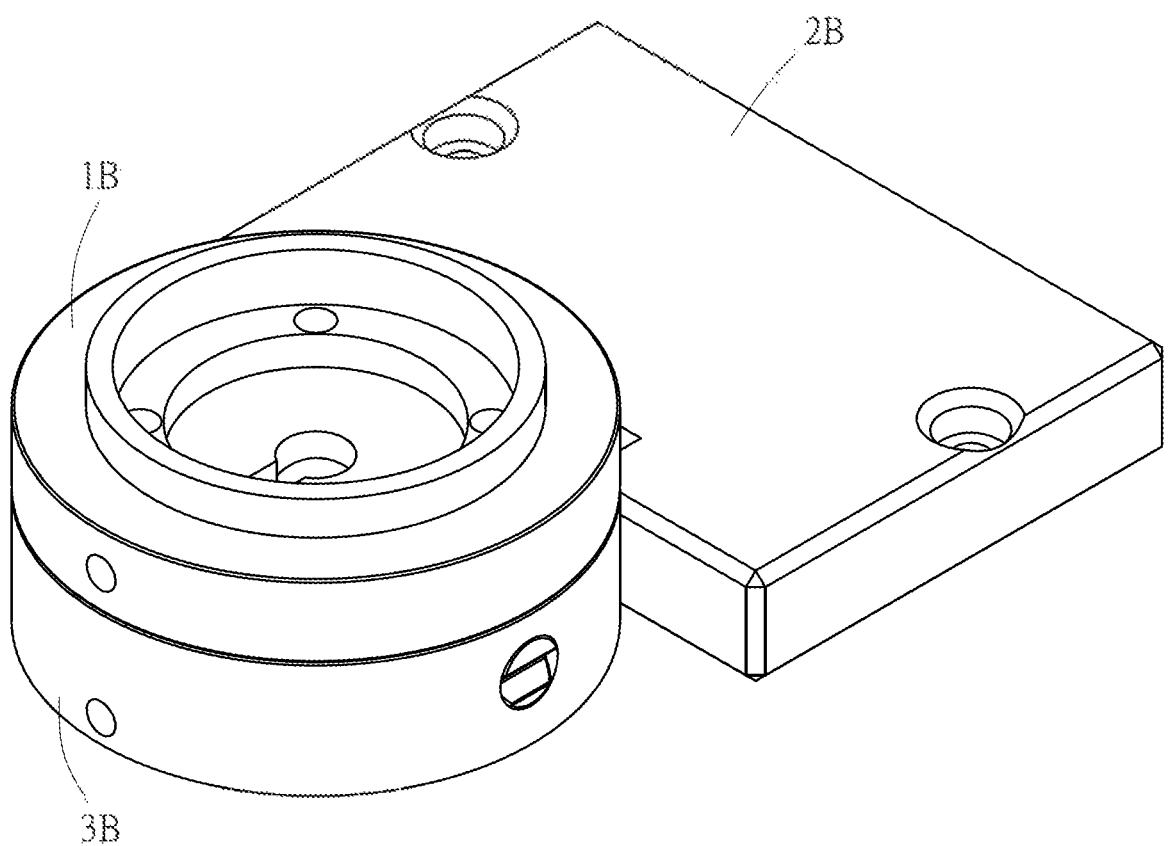
FIG. 25 is a perspective view of the second coupling unit held by the tool changer gripper and the first coupling unit coupled with the second coupling unit according to a third embodiment of the present invention.
Figure 26:
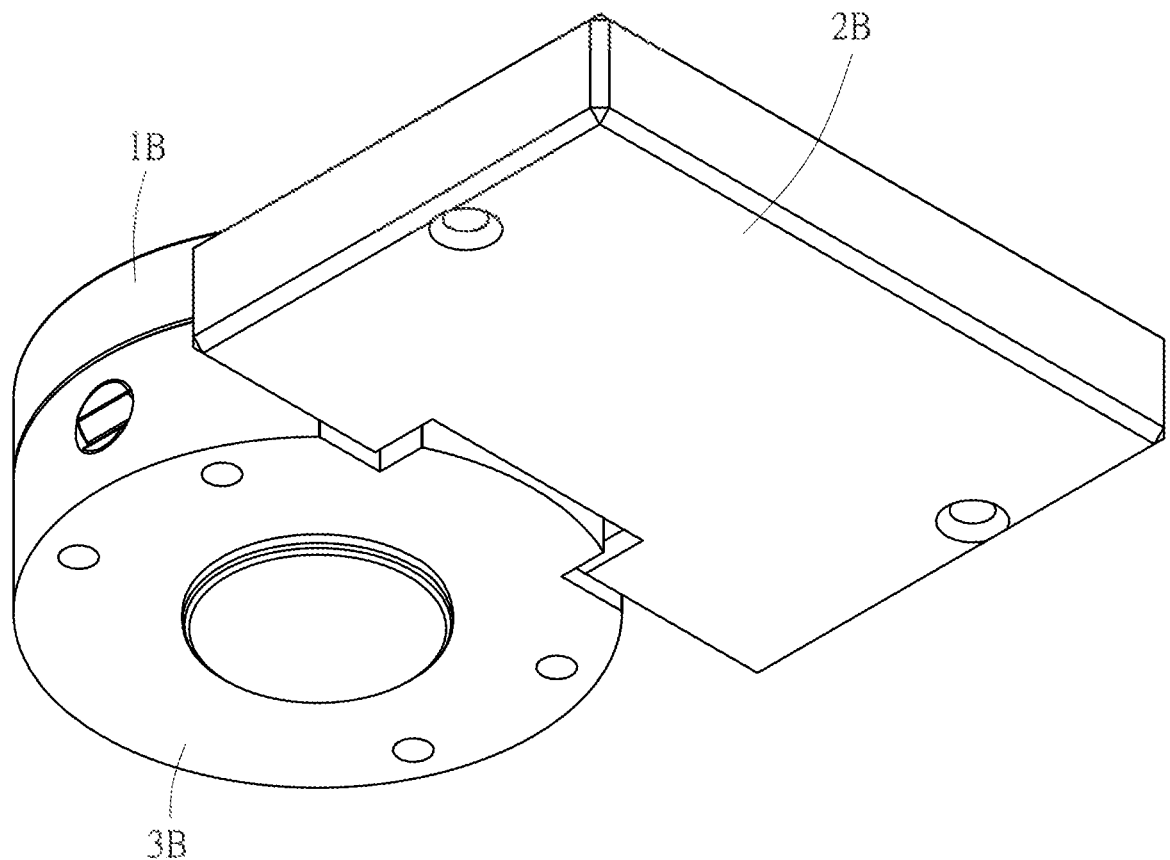
FIG. 26 is another perspective view of the second coupling unit held by the tool changer gripper and the first coupling unit coupled with the second coupling unit according to a third embodiment of the present invention.
Figure 27:
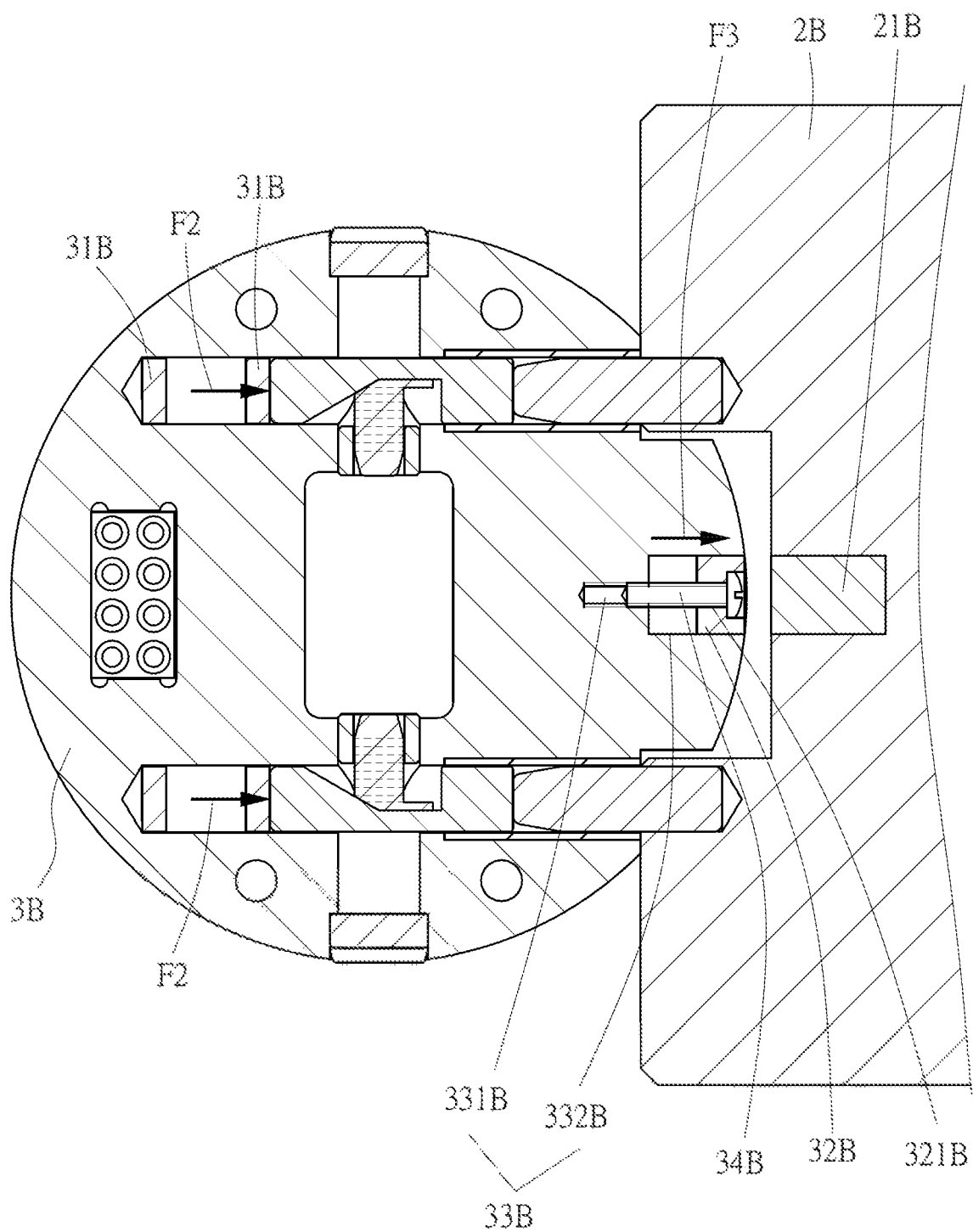
FIG. 27 is a sectional view of FIG. 25.
Figure 28:
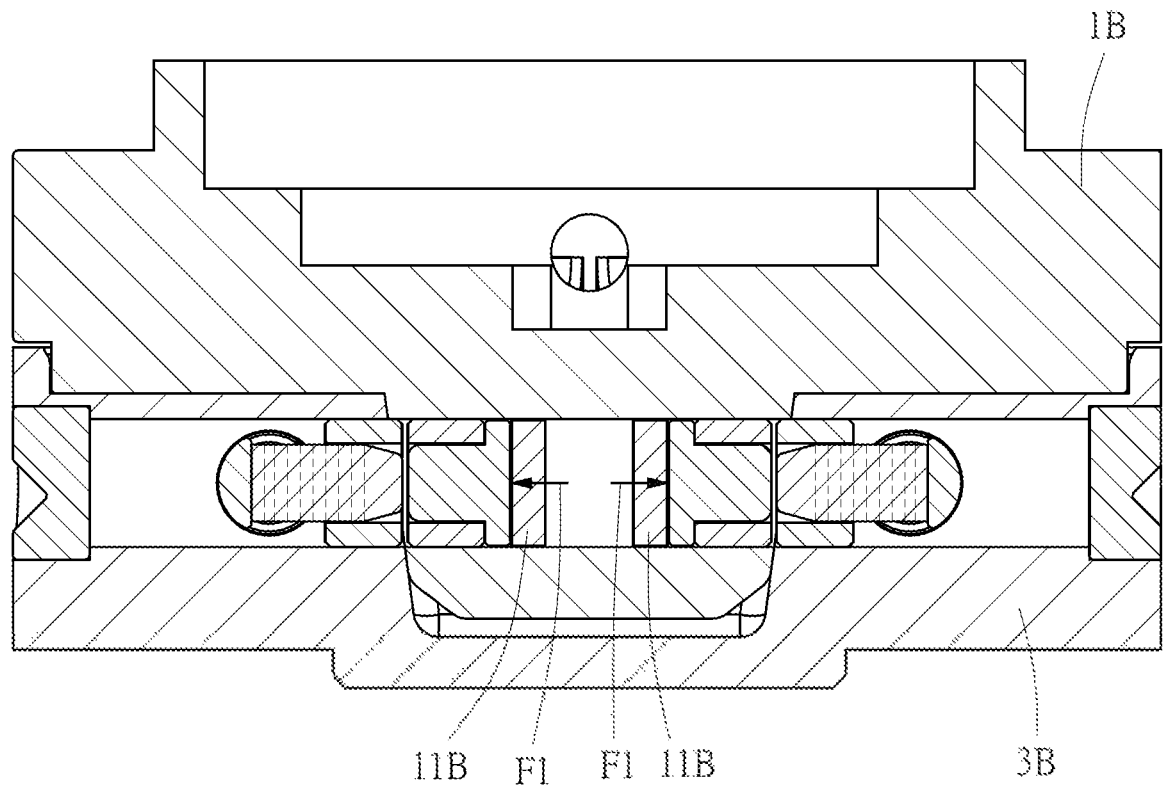
FIG. 28 is a sectional view of FIG. 25.

FIG. 25 and FIG. 26 illustrate a third embodiment of the robotic tool changer system of the present invention. The operation method of the third embodiment is substantially the same as that of the first embodiment. The tool change is performed through the interaction of the first acting force F1, the second acting force F2, and the third acting force F3. The third embodiment is substantially similar to the first embodiment with the exceptions described hereinafter. This embodiment comprises a first coupling unit 1B, a tool changer gripper 2B, and a second coupling unit 3B. Referring to FIG. 27 and FIG. 28, the first coupling unit 1B has a first force-applying member 11B to provide the first acting force F1, the second coupling unit 3B has a second force-applying member 31B to provide the second acting force F2, and the tool changer gripper 2B is provided with a third force-applying member 21B to provide the third acting force F3. The third force-applying member 21B is a magnetic member, and the second coupling unit 3B has a corresponding magnetically sensitive member 32B. The third acting force F3 is a magnetic force of the magnetic member. The position of the magnetic member or the magnetically sensitive member 32B is adjustable for changing the magnitude of the third acting force F3. Specifically, the second coupling unit 3B has a receiving groove 33B corresponding to the magnetic member. The receiving groove 33B includes a threaded section 331B and a straight groove section 332B. The magnetically sensitive member 32B has a perforation 321B. An adjustment screw 34B passes through the perforation 321B and is screwed to the threaded section 331B, so that the position of the magnetically sensitive member 32B is adjustable in the straight groove section 332B. When the distance between the magnetically sensitive member 32B and the magnetic member is less, the third acting force F3 is greater. Through the third acting force F3 to acton the magnetically sensitive member 32B, the second coupling unit 3B is held by the tool changer gripper 2B through the third acting force F3. For example, the magnitude of the third acting force F3 can be adjusted according to the weight of the tool connected to the second coupling unit 3B to prevent that when the first coupling unit 1B drives the second coupling unit 38 out of the tool changer gripper, there is excessive or insufficient resistance. In the tool change process, before the second coupling unit 3B completely leaves the tool changer gripper 2B, the third acting force F3 continues to be applied to the second coupling unit 3B to prevent the second coupling unit 3B from dropping. Similarly, when the second coupling unit 38 enters the tool changer gripper 2B, the second coupling unit 3B is always tightly gripped through the third acting force F3 to prevent the second coupling unit 3B from dropping in the tool change process. In this embodiment, the first force-applying member 11B is two repulsive magnetic members, and the second force-applying member 31B is two repulsive magnetic members. That is, in this embodiment, the first acting force F1, the second acting force F2 and the third acting force F3 are provided through the magnetic force.

Figure 29:
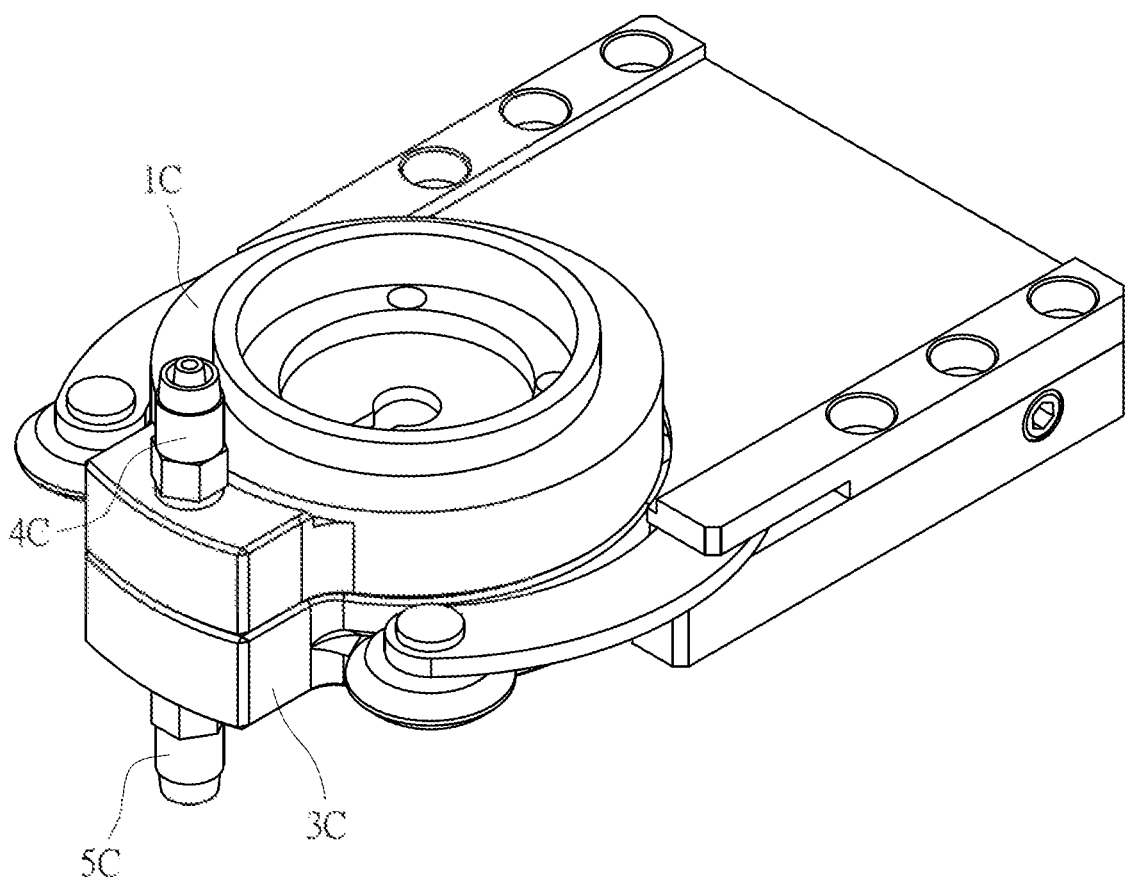
FIG. 29 is a perspective view of a fourth embodiment of the present invention, illustrating that the first pipe joint of the first coupling unit is connected to the second pipe joint of the second coupling unit.
Figure 30:
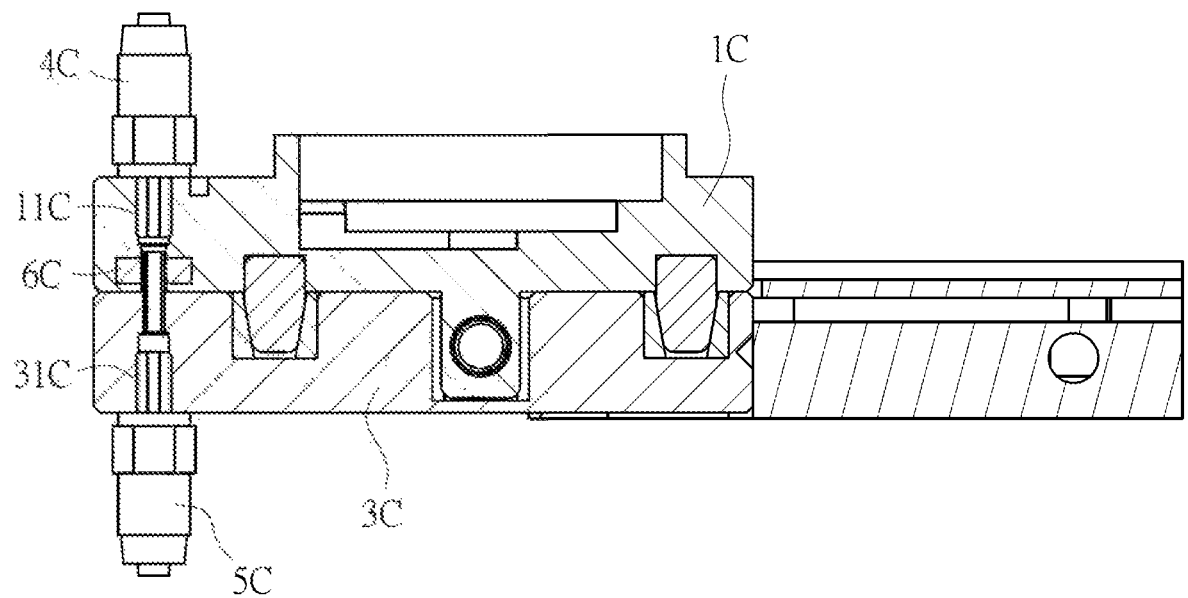
FIG. 30 is a schematic view of the fourth embodiment of the present invention, illustrating that the first pipe joint of the first coupling unit communicates with the second pipe joint of the second coupling unit through the first coupling hole and the second coupling hole, and the sealing member is disposed between the first coupling unit and the second coupling unit.
Figure 31:
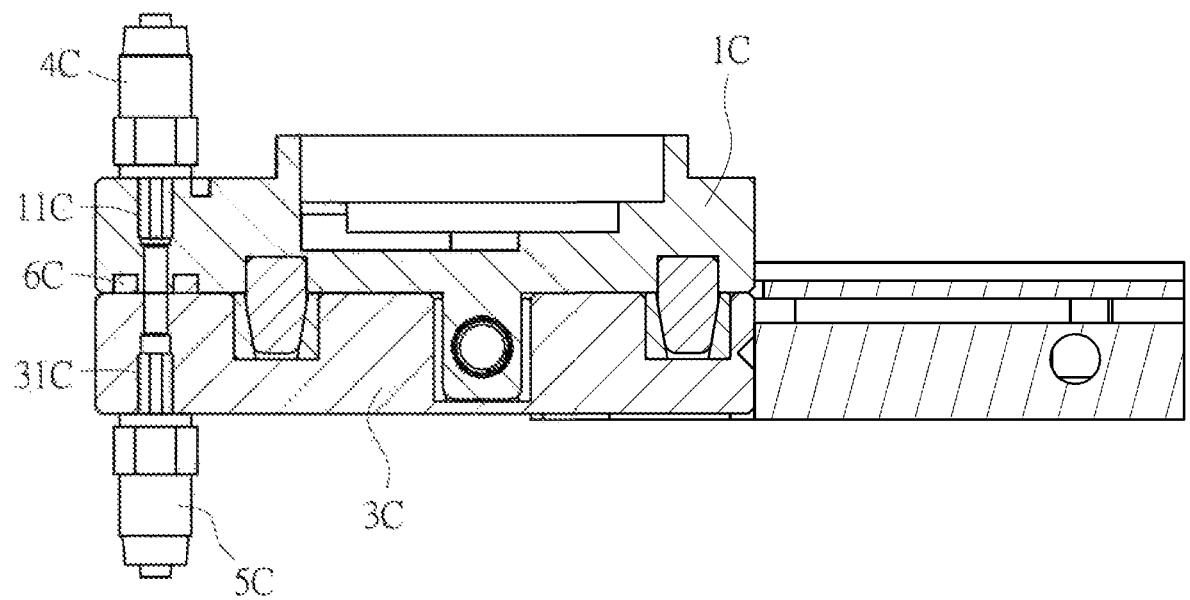
FIG. 31 is a schematic view of the fourth embodiment of the present invention, illustrating that the second pipe joint is inserted from the second coupling hole and extends into the first coupling hole to connect the first pipe joint, and the sealing member is disposed in the first coupling hole to surround the second pipe joint.

FIG. 29 illustrates a fourth embodiment of the robotic tool changer system of the present invention. The operation method of the fourth embodiment is substantially the same as that of the first embodiment. The fourth embodiment is substantially similar to the first embodiment with the exceptions described hereinafter. This embodiment comprises a first coupling unit 1C and a second coupling unit 3C. A first pipe joint 4C is connected to the first coupling unit 1C. A second pipe joint 5C is connected to the second coupling unit 3C. Referring to FIG. 30 and FIG. 31, specifically, the first coupling unit 1C has a first coupling hole 11C, and the second coupling unit 3C has a second coupling hole 31C. The first pipe joint 4C is connected to the first coupling hole 11C of the first coupling unit 1C. The second pipe joint 5C is connected to the second coupling hole 31C of the second coupling unit 3C. When the first coupling unit 1C is coupled with the second coupling unit 3C, the first pipe joint 4C and the second pipe joint 5C communicate with each other through the first coupling hole 11C and the second coupling hole 31C. The first coupling hole 11C or/and the second coupling hole 31C is provided with a sealing member 6C. Referring to FIG. 30, the first pipe joint 4C is inserted in the first coupling hole 11C, the second pipe joint 5C is inserted in the second coupling hole 31C, and the sealing member 6C is disposed between the first coupling unit 1C and the second coupling unit 3C. Alternatively, referring to FIG. 31, the first pipe joint 4C is inserted in the first coupling hole 11C, the second pipe joint 5C is inserted in the second coupling hole 31C and extends into the first coupling hole 11C to be connected to the first pipe joint 4C, and the sealing member 6C is disposed in the first coupling hole 11C and surrounds the second pipe joint 5C. The first pipe joint 4C may be connected with, for example, an air compressor or a hydraulic machine, and the second pipe joint 5C may be connected with, for example, a spray head, thereby serving as an air/oil pressure pipeline for conveying air or oil in the machining process.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A robotic tool changer system, comprising:
a first coupling unit, fixed to a robot arm end shaft, the first coupling unit having a protruding portion, the protruding portion having a first guide hole extending along a third direction, a first ejector pin being provided in the first guide hole, the first ejector pin providing a first acting force;

a plurality of second coupling units each connected with a respective tool, each second coupling unit having a respective recess corresponding to the protruding portion, each second coupling unit including a respective movable guide lock and a respective movable second ejector pin movable in the third direction, wherein each of the second ejector pins is driven by the corresponding guide lock to extend out into the recess and is driven by the first acting force to retract out of the recess;

a plurality of tool changer grippers, each changer gripper including a respective third force-applying member and at least one protruding post, each second coupling unit being detachably connected to a corresponding one of the tool changer grippers;

wherein when the robot arm end shaft drives the first coupling unit to move in a second direction to contact a selected one of the second coupling units, the protruding portion is mated with the recess of the selected second coupling unit, wherein an angle is defined between a first direction and the second direction, wherein when the robot arm end shaft pulls the first coupling unit and the selected second coupling unit away from the corresponding tool changer gripper along the first direction, the guide lock of the selected second coupling unit applies a second acting force to overcome the first acting force so as to drive the second ejector pin of the selected second coupling unit to push the first ejector pin so that the second ejector pin of the selected second coupling unit extends into the first guide hole, and the first coupling unit is coupled with the selected second coupling unit;

wherein when the robot arm end shaft drives the first coupling unit and the selected second coupling unit to move to the corresponding tool changer gripper along the first direction, the corresponding at least one protruding post pushes the guide lock of the selected second coupling unit to overcome the second acting force, the first ejector pin pushes the second ejector pin of the selected second coupling unit via the first acting force so that the second ejector pin of the selected second coupling unit is retracted out of the recess, and the corresponding third force-applying member applies a third acting force to hold the selected second coupling unit, and wherein the first coupling unit is moved away from the selected second coupling unit, which is held by the corresponding tool changer gripper, along the second direction.

2. The robotic tool changer system as claimed in claim 1, wherein the first coupling unit includes a first periphery and a first contact surface, the first coupling unit has a first mating portion, wherein each second coupling unit includes a respective second periphery and a respective second contact surface, and each second coupling unit has a respective second mating portion corresponding to the first mating portion.

3. The robotic tool changer system as claimed in claim 2, wherein the first mating portion is at least one retaining post, the at least one retaining post is located on the first contact surface, the at least one retaining post is gradually tapered away from the first contact surface, each second mating portion is at least one positioning hole, and the at least one positioning hole is located on the corresponding second contact surface.

4. The robotic tool changer system as claimed in claim 3, wherein each second coupling unit has at least one guide lock groove to accommodate the corresponding guide lock and to accommodate a corresponding second force-applying member, each guide lock has a respective concave portion and a respective guide slope, each second ejector pin has a respective second ejector pin slope corresponding to the corresponding guide slope, wherein when the selected second coupling unit is moved away from the corresponding tool changer gripper, the second force-applying member of the selected second coupling unit applies the second acting force to drive the guide lock of the selected second coupling unit, through cooperation of the guide slope of the selected second coupling unit and the second ejector pin slope of the selected second coupling unit, the second ejector pin of the selected second coupling unit extends into the recess of the selected second coupling unit to overcome the first acting force and to extend into the first guide hole; and wherein when the selected second coupling unit contacts the corresponding tool changer gripper, the protruding post of the corresponding tool changer gripper extends into the at least one guide lock groove of the selected second coupling unit, the at least one protruding post of the corresponding tool changer gripper pushes the guide lock of the selected second coupling unit to overcome the corresponding second acting force, the first ejector pin pushes the second ejector pin of the selected second coupling unit via the first acting force to move toward the corresponding concave portion, so that the second ejector pin is moved out of the first guide hole and retracted out of the recess.

5. The robotic tool changer system as claimed in claim 4, wherein a first force-applying member is provided in the first guide hole, the first force-applying member applies the first acting force to the first ejector pin, and wherein either: (i) the first force-applying member is a magnetic member and each second force-applying member is a magnetic member, or (ii) the first force-applying member is an elastic member and each second force-applying member is an elastic member.

6. The robotic tool changer system as claimed in claim 3, wherein the first coupling unit has a first terminal portion and a second guide hole, wherein a power wire of the robot arm end shaft, and a signal wire of the robot arm end shaft, pass through the second guide hole and are connected to the first terminal portion;

wherein each second coupling unit has a respective second terminal portion, each second terminal portion is electrically connected to the corresponding tool, and wherein via the first terminal portion to be connected to the second terminal portion of the selected second coupling unit, power and/or control signals are transmitted between the robot arm end shaft and the corresponding tool.

7. The robotic tool changer system as claimed in claim 3, wherein the first coupling unit has a first coupling hole, each second coupling unit has a respective second coupling hole, a first pipe joint is connected to the first coupling hole of the first coupling unit, and a respective second pipe joint is connected to each second coupling hole of each second coupling unit, wherein the first coupling hole and/or each second coupling hole is provided with a respective sealing member; and wherein when the first coupling unit is coupled with the selected second coupling unit, the first pipe joint and the second pipe joint of the selected second coupling unit communicate with each other through the first coupling hole and the second coupling hole of the selected second coupling unit.

8. The robotic tool changer system as claimed in claim 2, wherein the first mating portion is an annular groove, the annular groove is located at a junction of the first periphery and the first contact surface, each second mating portion is a flange located at a junction of the corresponding second periphery and the corresponding second contact surface, and wherein the protruding portion has a chamfer.

9. The robotic tool changer system as claimed in claim 8,
wherein each second coupling unit has at least one guide lock groove to accommodate the corresponding guide lock and to accommodate a corresponding second force-applying member, each guide lock has a respective concave portion and a respective guide slope, each second ejector pin has a respective second ejector pin slope corresponding to the corresponding guide slope,
wherein when the selected second coupling unit is moved away from the corresponding tool changer gripper, the second force-applying member of the selected second coupling unit applies the second acting force to drive the guide lock of the selected second coupling unit, through cooperation of the guide slope of the selected second coupling unit and the second ejector pin slope of the selected second coupling unit, the second ejector pin of the selected second coupling unit extends into the recess of the selected second coupling unit to overcome the first acting force and to extend into the first guide hole; and
wherein when the selected second coupling unit contacts the corresponding tool changer gripper, the protruding post of the corresponding tool changer gripper extends into the at least one guide lock groove of the selected second coupling unit, the at least one protruding post of the corresponding tool changer gripper pushes the guide lock of the selected second coupling unit to overcome the corresponding second acting force, the first ejector pin pushes the second ejector pin of the selected second coupling unit via the first acting force to move toward the corresponding concave portion, so that the second ejector pin is moved out of the first guide hole and retracted out of the recess.

10. The robotic tool changer system as claimed in claim 9,
wherein a first force-applying member is provided in the first guide hole, the first force-applying member applies the first acting force to the first ejector pin, and
wherein either: (i) the first force-applying member is a magnetic member and each second force-applying member is a magnetic member, or (ii) the first force-applying member is an elastic member and each second force-applying member is an elastic member.

11. The robotic tool changer system as claimed in claim 8,
wherein the first coupling unit has a first terminal portion and a second guide hole,
wherein a power wire of the robot arm end shaft, and a signal wire of the robot arm end shaft, pass through the second guide hole and are connected to the first terminal portion;
wherein each second coupling unit has a respective second terminal portion, each second terminal portion is electrically connected to the corresponding tool, and
wherein via the first terminal portion to be connected to the second terminal portion of the selected second coupling unit, power and/or control signals are transmitted between the robot arm end shaft and the corresponding tool.

12. The robotic tool changer system as claimed in claim 2,
wherein each second coupling unit has at least one guide lock groove to accommodate the corresponding guide lock and to accommodate a corresponding second force-applying member, each guide lock has a respective concave portion and a respective guide slope, each second ejector pin has a respective second ejector pin slope corresponding to the corresponding guide slope,
wherein when the selected second coupling unit is moved away from the corresponding tool changer gripper, the second force-applying member of the selected second coupling unit applies the second acting force to drive the guide lock of the selected second coupling unit, through cooperation of the guide slope of the selected second coupling unit and the second ejector pin slope of the selected second coupling unit, the second ejector pin of the selected second coupling unit extends into the recess of the selected second coupling unit to overcome the first acting force and to extend into the first guide hole; and
wherein when the selected second coupling unit contacts the corresponding tool changer gripper, the protruding post of the corresponding tool changer gripper extends into the at least one guide lock groove of the selected second coupling unit, the at least one protruding post of the corresponding tool changer gripper pushes the guide lock of the selected second coupling unit to overcome the corresponding second acting force, the first ejector pin pushes the second ejector pin of the selected second coupling unit via the first acting force to move toward the corresponding concave portion, so that the second ejector pin is moved out of the first guide hole and retracted out of the recess.

13. The robotic tool changer system as claimed in claim 12,
wherein a first force-applying member is provided in the first guide hole, the first force-applying member applies the first acting force to the first ejector pin, and
wherein either: (i) the first force-applying member is a magnetic member and each second force-applying member is a magnetic member, or (ii) the first force-applying member is an elastic member and each second force-applying member is an elastic member.

14. The robotic tool changer system as claimed in claim 2,
wherein the first coupling unit has a first terminal portion and a second guide hole,
wherein a power wire of the robot arm end shaft, and a signal wire of the robot arm end shaft, pass through the second guide hole and are connected to the first terminal portion;
wherein each second coupling unit has a respective second terminal portion, each second terminal portion is electrically connected to the corresponding tool, and
wherein via the first terminal portion to be connected to the second terminal portion of the selected second coupling unit, power and/or control signals are transmitted between the robot arm end shaft and the corresponding tool.

15. The robotic tool changer system as claimed in claim 2,
wherein the first coupling unit has a first coupling hole, each second coupling unit has a respective second coupling hole, a first pipe joint is connected to the first coupling hole of the first coupling unit, and a respective second pipe joint is connected to each second coupling hole of each second coupling unit,
wherein the first coupling hole and/or each second coupling hole is provided with a respective sealing member; and
wherein when the first coupling unit is coupled with the selected second coupling unit, the first pipe joint and the second pipe joint of the selected second coupling unit communicate with each other through the first coupling hole and the second coupling hole of the selected second coupling unit.

16. The robotic tool changer system as claimed in claim 1,
wherein each third force-applying member includes a respective first gripping member, a respective second gripping member, and a respective force-applying unit,
wherein each first gripping member and each second gripping member define a respective accommodating portion, each accommodating portion includes a respective end opening,
wherein each of the accommodating portions of each tool changer gripper is configured to accommodate the corresponding second coupling unit, wherein each of the first gripping members is movable relative to the corresponding second gripping member in a first plane, the first plane is constituted by the first direction and the third direction, each first gripping member has a corresponding first gripping end, each second gripping member has a corresponding second gripping end, each end opening is a gap defined by a distance between the corresponding first gripping end and the corresponding second gripping end, the corresponding force-applying unit acts on the corresponding first gripping member or/and the corresponding second gripping member, and each third acting force is a corresponding first planar gripping force of the corresponding first gripping end and the corresponding second gripping end in the first plane.

17. The robotic tool changer system as claimed in claim 16, wherein each second coupling unit includes a respective second periphery, each second periphery is recessed along the first plane with a corresponding guide groove, each first gripping end of each first gripping member is provided with a respective rotatable first roller, each second gripping end of each second gripping member is provided with a respective rotatable second roller, and each first roller and each second roller grip the corresponding guide groove in the first plane.

18. The robotic tool changer system as claimed in claim 17,
wherein each second coupling unit has at least one guide lock groove to accommodate the corresponding guide lock and to accommodate a corresponding second force-applying member, each guide lock has a respective concave portion and a respective guide slope, each second ejector pin has a respective second ejector pin slope corresponding to the corresponding guide slope,
wherein when the selected second coupling unit is moved away from the corresponding tool changer gripper, the second force-applying member of the selected second coupling unit applies the second acting force to drive the guide lock of the selected second coupling unit, through cooperation of the guide slope of the selected second coupling unit and the second ejector pin slope of the selected second coupling unit, the second ejector pin of the selected second coupling unit extends into the recess of the selected second coupling unit to overcome the first acting force and to extend into the first guide hole; and
wherein when the selected second coupling unit contacts the corresponding tool changer gripper, the protruding post of the corresponding tool changer gripper extends into the at least one guide lock groove of the selected second coupling unit, the at least one protruding post of the corresponding tool changer gripper pushes the guide lock of the selected second coupling unit to overcome the corresponding second acting force, the first ejector pin pushes the second ejector pin of the selected second coupling unit via the first acting force to move toward the corresponding concave portion, so that the second ejector pin is moved out of the first guide hole and retracted out of the recess.

19. The robotic tool changer system as claimed in claim 18,
wherein a first force-applying member is provided in the first guide hole, the first force-applying member applies the first acting force to the first ejector pin, and
wherein either: (i) the first force-applying member is a magnetic member and each second force-applying member is a magnetic member, or (ii) the first force-applying member is an elastic member and each second force-applying member is an elastic member.

20. The robotic tool changer system as claimed in claim 17,
wherein the first coupling unit has a first terminal portion and a second guide hole,
wherein a power wire of the robot arm end shaft, and a signal wire of the robot arm end shaft, pass through the second guide hole and are connected to the first terminal portion;
wherein each second coupling unit has a respective second terminal portion, each second terminal portion is electrically connected to the corresponding tool, and
wherein via the first terminal portion to be connected to the second terminal portion of the selected second coupling unit, power and/or control signals are transmitted between the robot arm end shaft and the corresponding tool.

21. The robotic tool changer system as claimed in claim 17,
wherein the first coupling unit has a first coupling hole, each second coupling unit has a respective second coupling hole, a first pipe joint is connected to the first coupling hole of the first coupling unit, and a respective second pipe joint is connected to each second coupling hole of each second coupling unit,
wherein the first coupling hole and/or each second coupling hole is provided with a respective sealing member; and
wherein when the first coupling unit is coupled with the selected second coupling unit, the first pipe joint and the second pipe joint of the selected second coupling unit communicate with each other through the first coupling hole and the second coupling hole of the selected second coupling unit.

22. The robotic tool changer system as claimed in claim 16,
wherein each second coupling unit has at least one guide lock groove to accommodate the corresponding guide lock and to accommodate a corresponding second force-applying member, each guide lock has a respective concave portion and a respective guide slope, each second ejector pin has a respective second ejector pin slope corresponding to the corresponding guide slope,
wherein when the selected second coupling unit is moved away from the corresponding tool changer gripper, the second force-applying member of the selected second coupling unit applies the second acting force to drive the guide lock of the selected second coupling unit, through cooperation of the guide slope of the selected second coupling unit and the second ejector pin slope of the selected second coupling unit, the second ejector pin of the selected second coupling unit extends into the recess of the selected second coupling unit to overcome the first acting force and to extend into the first guide hole; and
wherein when the selected second coupling unit contacts the corresponding tool changer gripper, the protruding post of the corresponding tool changer gripper extends into the at least one guide lock groove of the selected second coupling unit, the at least one protruding post of the corresponding tool changer gripper pushes the guide lock of the selected second coupling unit to overcome the corresponding second acting force, the first ejector pin pushes the second ejector pin of the selected second coupling unit via the first acting force to move toward the corresponding concave portion, so that the second ejector pin is moved out of the first guide hole and retracted out of the recess.

23. The robotic tool changer system as claimed in claim 22,
wherein a first force-applying member is provided in the first guide hole, the first force-applying member applies the first acting force to the first ejector pin, and
wherein either: (i) the first force-applying member is a magnetic member and each second force-applying member is a magnetic member, or (ii) the first force-applying member is an elastic member and each second force-applying member is an elastic member.

24. The robotic tool changer system as claimed in claim 16,
wherein the first coupling unit has a first terminal portion and a second guide hole,
wherein a power wire of the robot arm end shaft, and a signal wire of the robot arm end shaft, pass through the second guide hole and are connected to the first terminal portion;
wherein each second coupling unit has a respective second terminal portion, each second terminal portion is electrically connected to the corresponding tool, and
wherein via the first terminal portion to be connected to the second terminal portion of the selected second coupling unit, power and/or control signals are transmitted between the robot arm end shaft and the corresponding tool.

25. The robotic tool changer system as claimed in claim 16,
wherein the first coupling unit has a first coupling hole, each second coupling unit has a respective second coupling hole, a first pipe joint is connected to the first coupling hole of the first coupling unit, and a respective second pipe joint is connected to each second coupling hole of each second coupling unit,
wherein the first coupling hole and/or each second coupling hole is provided with a respective sealing member; and
wherein when the first coupling unit is coupled with the selected second coupling unit, the first pipe joint and the second pipe joint of the selected second coupling unit communicate with each other through the first coupling hole and the second coupling hole of the selected second coupling unit.

26. The robotic tool changer system as claimed in claim 1,
wherein the first acting force, the second acting force and the third acting force are each an elastic force, or
wherein the first acting force, the second acting force, and the third acting force are each a magnetic force.

27. The robotic tool changer system as claimed in claim 26,
wherein each second coupling unit has at least one guide lock groove to accommodate the corresponding guide lock and to accommodate a corresponding second force-applying member, each guide lock has a respective concave portion and a respective guide slope, each second ejector pin has a respective second ejector pin slope corresponding to the corresponding guide slope,
wherein when the selected second coupling unit is moved away from the corresponding tool changer gripper, the second force-applying member of the selected second coupling unit applies the second acting force to drive the guide lock of the selected second coupling unit, through cooperation of the guide slope of the selected second coupling unit and the second ejector pin slope of the selected second coupling unit, the second ejector pin of the selected second coupling unit extends into the recess of the selected second coupling unit to overcome the first acting force and to extend into the first guide hole; and
wherein when the selected second coupling unit contacts the corresponding tool changer gripper, the protruding post of the corresponding tool changer gripper extends into the at least one guide lock groove of the selected second coupling unit, the at least one protruding post of the corresponding tool changer gripper pushes the guide lock of the selected second coupling unit to overcome the corresponding second acting force, the first ejector pin pushes the second ejector pin of the selected second coupling unit via the first acting force to move toward the corresponding concave portion, so that the second ejector pin is moved out of the first guide hole and retracted out of the recess.

28. The robotic tool changer system as claimed in claim 27,
wherein a first force-applying member is provided in the first guide hole, the first force-applying member applies the first acting force to the first ejector pin, and
wherein either: (i) the first force-applying member is a magnetic member and each second force-applying member is a magnetic member, or (ii) the first force-applying member is an elastic member and each second force-applying member is an elastic member.

29. The robotic tool changer system as claimed in claim 26,
wherein the first coupling unit has a first terminal portion and a second guide hole, wherein a power wire of the robot arm end shaft, and a signal wire of the robot arm end shaft, pass through the second guide hole and are connected to the first terminal portion;

wherein each second coupling unit has a respective second terminal portion, each second terminal portion is electrically connected to the corresponding tool, and wherein via the first terminal portion to be connected to the second terminal portion of the selected second coupling unit, power and/or control signals are transmitted between the robot arm end shaft and the corresponding tool.

30. The robotic tool changer system as claimed in claim 26,
wherein the first coupling unit has a first coupling hole, each second coupling unit has a respective second coupling hole, a first pipe joint is connected to the first coupling hole of the first coupling unit, and a respective second pipe joint is connected to each second coupling hole of each second coupling unit, wherein the first coupling hole and/or each second coupling hole is provided with a respective sealing member; and wherein when the first coupling unit is coupled with the selected second coupling unit, the first pipe joint and the second pipe joint of the selected second coupling unit communicate with each other through the first coupling hole and the second coupling hole of the selected second coupling unit.

31. The robotic tool changer system as claimed in claim 1, wherein each third force-applying member is a respective magnetic member, each second coupling unit includes a respective magnetically sensitive member, each third acting force is a magnetic force of the corresponding magnetic member, and each third acting force acts on the corresponding magnetically sensitive member so that the corresponding tool changer gripper holds the corresponding second coupling unit through via the corresponding third acting force.

32. The robotic tool changer system as claimed in claim 31, wherein each magnetic member or each magnetically sensitive member is adjustable in position for changing the corresponding third acting force.

33. The robotic tool changer system as claimed in claim 32, wherein each second coupling unit has a respective receiving groove corresponding to the corresponding magnetic member, each receiving groove includes a respective threaded section and a respective straight groove section, each magnetically sensitive member has a respective perforation, a respective adjustment screw passes through each perforation and is screwed to the corresponding threaded section, so that the position of the corresponding magnetically sensitive member is adjustable in the corresponding straight groove section.

34. The robotic tool changer system as claimed in claim 33,
wherein each second coupling unit has at least one guide lock groove to accommodate the corresponding guide lock and to accommodate a corresponding second force-applying member, each guide lock has a respective concave portion and a respective guide slope, each second ejector pin has a respective second ejector pin slope corresponding to the corresponding guide slope, wherein when the selected second coupling unit is moved away from the corresponding tool changer gripper, the second force-applying member of the selected second coupling unit applies the second acting force to drive the guide lock of the selected second coupling unit, through cooperation of the guide slope of the selected second coupling unit and the second ejector pin slope of the selected second coupling unit, the second ejector pin of the selected second coupling unit extends into the recess of the selected second coupling unit to overcome the first acting force and to extend into the first guide hole; and wherein when the selected second coupling unit contacts the corresponding tool changer gripper, the protruding post of the corresponding tool changer gripper extends into the at least one guide lock groove of the selected second coupling unit, the at least one protruding post of the corresponding tool changer gripper pushes the guide lock of the selected second coupling unit to overcome the corresponding second acting force, the first ejector pin pushes the second ejector pin of the selected second coupling unit via the first acting force to move toward the corresponding concave portion, so that the second ejector pin is moved out of the first guide hole and retracted out of the recess.

35. The robotic tool changer system as claimed in claim 34,
wherein a first force-applying member is provided in the first guide hole, the first force-applying member applies the first acting force to the first ejector pin, and wherein the first force-applying member is a magnetic member and each second force-applying member is a magnetic member.

36. The robotic tool changer system as claimed in claim 33,
wherein the first coupling unit has a first terminal portion and a second guide hole, wherein a power wire of the robot arm end shaft, and a signal wire of the robot arm end shaft, pass through the second guide hole and are connected to the first terminal portion;

wherein each second coupling unit has a respective second terminal portion, each second terminal portion is electrically connected to the corresponding tool, and wherein via the first terminal portion to be connected to the second terminal portion of the selected second coupling unit, power and/or control signals are transmitted between the robot arm end shaft and the corresponding tool.

37. The robotic tool changer system as claimed in claim 32,
wherein each second coupling unit has at least one guide lock groove to accommodate the corresponding guide lock and to accommodate a corresponding second force-applying member, each guide lock has a respective concave portion and a respective guide slope, each second ejector pin has a respective second ejector pin slope corresponding to the corresponding guide slope, wherein when the selected second coupling unit is moved away from the corresponding tool changer gripper, the second force-applying member of the selected second coupling unit applies the second acting force to drive the guide lock of the selected second coupling unit, through cooperation of the guide slope of the selected second coupling unit and the second ejector pin slope of the selected second coupling unit, the second ejector pin of the selected second coupling unit extends into the recess of the selected second coupling unit to overcome the first acting force and to extend into the first guide hole; and wherein when the selected second coupling unit contacts the corresponding tool changer gripper, the protruding post of the corresponding tool changer gripper extends into the at least one guide lock groove of the selected second coupling unit, the at least one protruding post of the corresponding tool changer gripper pushes the guide lock of the selected second coupling unit to overcome the corresponding second acting force, the first ejector pin pushes the second ejector pin of the selected second coupling unit via the first acting force to move toward the corresponding concave portion, so that the second ejector pin is moved out of the first guide hole and retracted out of the recess.

38. The robotic tool changer system as claimed in claim 37,
wherein a first force-applying member is provided in the first guide hole, the first force-applying member applies the first acting force to the first ejector pin, and
wherein the first force-applying member is a magnetic member and each second force-applying member is a magnetic member.

39. The robotic tool changer system as claimed in claim 32,
wherein the first coupling unit has a first terminal portion and a second guide hole,
wherein a power wire of the robot arm end shaft, and a signal wire of the robot arm end shaft, pass through the second guide hole and are connected to the first terminal portion;
wherein each second coupling unit has a respective second terminal portion, each second terminal portion is electrically connected to the corresponding tool, and
wherein via the first terminal portion to be connected to the second terminal portion of the selected second coupling unit, power and/or control signals are transmitted between the robot arm end shaft and the corresponding tool.

40. The robotic tool changer system as claimed in claim 31,
wherein each second coupling unit has at least one guide lock groove to accommodate the corresponding guide lock and to accommodate a corresponding second force-applying member, each guide lock has a respective concave portion and a respective guide slope, each second ejector pin has a respective second ejector pin slope corresponding to the corresponding guide slope,
wherein when the selected second coupling unit is moved away from the corresponding tool changer gripper, the second force-applying member of the selected second coupling unit applies the second acting force to drive the guide lock of the selected second coupling unit, through cooperation of the guide slope of the selected second coupling unit and the second ejector pin slope of the selected second coupling unit, the second ejector pin of the selected second coupling unit extends into the recess of the selected second coupling unit to overcome the first acting force and to extend into the first guide hole; and
wherein when the selected second coupling unit contacts the corresponding tool changer gripper, the protruding post of the corresponding tool changer gripper extends into the at least one guide lock groove of the selected second coupling unit, the at least one protruding post of the corresponding tool changer gripper pushes the guide lock of the selected second coupling unit to overcome the corresponding second acting force, the first ejector pin pushes the second ejector pin of the selected second coupling unit via the first acting force to move toward the corresponding concave portion, so that the second ejector pin is moved out of the first guide hole and retracted out of the recess.

41. The robotic tool changer system as claimed in claim 40,
wherein a first force-applying member is provided in the first guide hole, the first force-applying member applies the first acting force to the first ejector pin, and
wherein the first force-applying member is a magnetic member and each second force-applying member is a magnetic member.

42. The robotic tool changer system as claimed in claim 31,
wherein the first coupling unit has a first terminal portion and a second guide hole,
wherein a power wire of the robot arm end shaft, and a signal wire of the robot arm end shaft, pass through the second guide hole and are connected to the first terminal portion;
wherein each second coupling unit has a respective second terminal portion, each second terminal portion is electrically connected to the corresponding tool, and
wherein via the first terminal portion to be connected to the second terminal portion of the selected second coupling unit, power and/or control signals are transmitted between the robot arm end shaft and the corresponding tool.

43. The robotic tool changer system as claimed in claim 1,
wherein each second coupling unit has at least one guide lock groove to accommodate the corresponding guide lock and to accommodate a corresponding second force-applying member, each guide lock has a respective concave portion and a respective guide slope, each second ejector pin has a respective second ejector pin slope corresponding to the corresponding guide slope,
wherein when the selected second coupling unit is moved away from the corresponding tool changer gripper, the second force-applying member of the selected second coupling unit applies the second acting force to drive the guide lock of the selected second coupling unit, through cooperation of the guide slope of the selected second coupling unit and the second ejector pin slope of the selected second coupling unit, the second ejector pin of the selected second coupling unit extends into the recess of the selected second coupling unit to overcome the first acting force and to extend into the first guide hole; and
wherein when the selected second coupling unit contacts the corresponding tool changer gripper, the protruding post of the corresponding tool changer gripper extends into the at least one guide lock groove of the selected second coupling unit, the at least one protruding post of the corresponding tool changer gripper pushes the guide lock of the selected second coupling unit to overcome the corresponding second acting force, the first ejector pin pushes the second ejector pin of the selected second coupling unit via the first acting force to move toward the corresponding concave portion, so that the second ejector pin is moved out of the first guide hole and retracted out of the recess.

44. The robotic tool changer system as claimed in claim 43,
wherein a first force-applying member is provided in the first guide hole, the first force-applying member applies the first acting force to the first ejector pin, and
wherein either: (i) the first force-applying member is a magnetic member and each second force-applying member is a magnetic member, or (ii) the first force-applying member is an elastic member and each second force-applying member is an elastic member.

45. The robotic tool changer system as claimed in claim 1,
wherein the first coupling unit has a first terminal portion and a second guide hole,
wherein a power wire of the robot arm end shaft, and a signal wire of the robot arm end shaft, pass through the second guide hole and are connected to the first terminal portion;
wherein each second coupling unit has a respective second terminal portion, each second terminal portion is electrically connected to the corresponding tool, and
wherein via the first terminal portion to be connected to the second terminal portion of the selected second coupling unit, power and/or control signals are transmitted between the robot arm end shaft and the corresponding tool.

46. The robotic tool changer system as claimed in claim 1,
wherein the first coupling unit has a first coupling hole, each second coupling unit has a respective second coupling hole, a first pipe joint is connected to the first coupling hole of the first coupling unit, and a respective second pipe joint is connected to each second coupling hole of each second coupling unit,
wherein the first coupling hole and/or each second coupling hole is provided with a respective sealing member; and
wherein when the first coupling unit is coupled with the selected second coupling unit, the first pipe joint and the second pipe joint of the selected second coupling unit communicate with each other through the first coupling hole and the second coupling hole of the selected second coupling unit.

* * * * *